United States Patent [19]

Chance et al.

[11] Patent Number: 4,870,539
[45] Date of Patent: Sep. 26, 1989

[54] DOPED TITANATE GLASS-CERAMIC FOR GRAIN BOUNDARY BARRIER LAYER CAPACITORS

[75] Inventors: Dudley A. Chance, Newtown, Conn.; Yung-Haw Hu, Hockessin, Del.

[73] Assignee: International Business Machines Corporation, Armonk, N.Y.

[21] Appl. No.: 297,907

[22] Filed: Jan. 17, 1989

[51] Int. Cl.⁴ .................. H01G 4/10; C04B 41/14; H01B 3/02; H01B 1/08
[52] U.S. Cl. .................. 361/321; 29/25.42; 252/62.3 BT; 264/61; 501/136
[58] Field of Search ........... 264/56, 61; 29/25.42; 361/320, 321; 252/62.3 BT; 501/136; 427/80; 428/697

[56] References Cited

U.S. PATENT DOCUMENTS

| 4,309,295 | 1/1982 | McSweeney | 501/136 X |
| 4,482,933 | 11/1984 | Alexander | 361/321 |
| 4,739,544 | 4/1988 | Okazaki et al. | 361/320 X |
| 4,799,127 | 1/1989 | Ono et al. | 361/321 |

Primary Examiner—Donald A. Griffin
Attorney, Agent, or Firm—Sughrue, Mion, Zinn, Macpeak and Seas

[57] ABSTRACT

A high dielectric constant glass-ceramic material comprising small conducting grains based on $BaTiO_3$ and/or $SrTiO_3$ on the order of about 0.5–10.0 μm surrounded by a thin microcrystalline insulating barrier layer at the grain boundary about 0.01–0.10 μm thick wherein the conductivity of the grains is enhanced by addition of about 0.1–4.0 mol % of a dopant selected from among Group V elements, Ge and Si substantially incorporated in the bulk lattice of the grains upon Ti sites. A novel process for forming the glass-ceramic material is also disclosed.

23 Claims, 20 Drawing Sheets

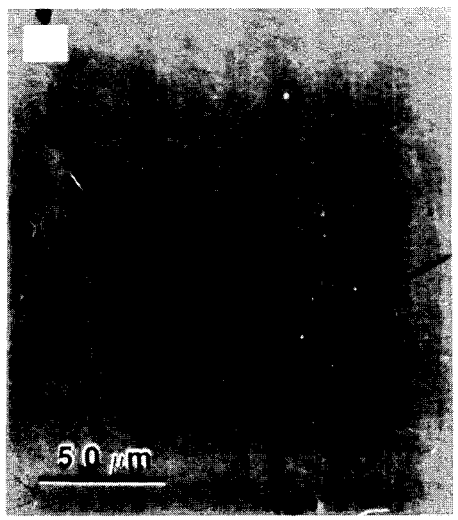 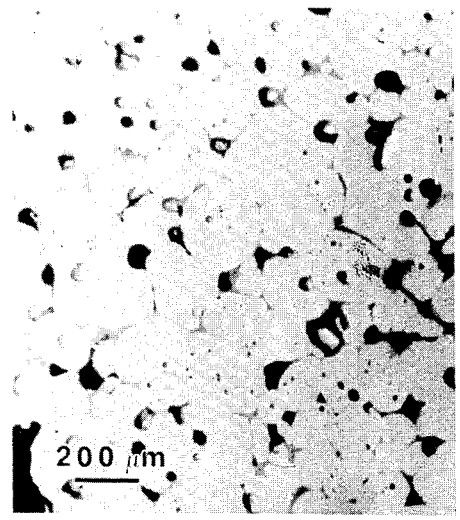
FIG.IA  FIG.IB

DOPED TITANATE GLASS-CERAMIC FOR GRAIN BOUNDARY BARRIER LAYER CAPACITORS

FIELD OF THE INVENTION

The present invention relates to a novel glass-ceramic material and process for its manufacture. More particularly, the present invention relates to a high dielectric constant material useful as a grain boundary barrier layer (GBBL) dielectric comprising a high conductivity grain surrounded by a thin insulating layer at the grain boundary. The GBBL dielectrics of a present invention are particularly useful for fabricating decoupling capacitors with matched thermal expansion coefficient to sili and which can be joined to or integrated within the multilayer substrate for semiconductor chip packaging.

BACKGROUND OF THE INVENTION

GBBL capacitors are capable of satisfying the ever increasing demand for small, high capacitance ceramic capacitors due to the rapid miniaturization of modern electronics. GBBL capacitor dielectrics comprising conducting grains separated by an insulating layer at the grain boundaries are usually formed by a two step firing process in a reducing atmosphere. The insulating layer at the grain boundary is usually formed either by oxidation or by impregnation with a glassy mixture during a second firing stage. FIG. 1 is a scanning electron micrograph of a typical GBBL dielectric based on $BaTiO_3$. Reference is made to S. Waku et al, "Classification and Dielectric Characteristics of the Boundary Layer Dielectrics (BL Dielectrics)", *Review of the Electrical Communication Laboratories*, 19:665 (1971) which discloses representative materials and processes using temperatures above 1000° C. for both first and second firing stage for fabricating these dielectrics.

In recent years the term glass-ceramic has been used to describe, (1) a mixture of a low melting temperature glass and a high melting temperature ceramic which coalesces to a dense partially crystalline mass on heating; and (2) a glass composition obtained by rapid cooling which on subsequent heating usually to temperatures below 1000° C. coalesces to a dense mass prior to crystallizing thereby resulting in a partially or wholly crystalline material. These glass ceramic materials have been fabricated as low dielectric constant materials as well as moderately high dielectric constant materials. Reference is made to Herczog, "Barrier Layers in Semiconducting Barium Titanate Glass-Ceramics", *Journal of the American Ceramic Society*, 67:484 (1984), and "Microcrystalline $BaTiO_3$ by Crystallization from Glass", *Journal of the American Ceramic Society*, 47:107 (1964) which disclose a representative two-step firing process wherein interconnected dispersions of semiconducting $BaTiO_3$ crystallites are sealed in a mostly glassy silicate matrix. However, there are several difficult problems associated with the oxidation or glass impregnation processes as described by Waku et al to produce GBBL capacitors: (1) the distribution of the insulating phase is uneven along the grain boundaries, (2) the thickness, 1–10 $\mu$m is difficult to control, and (3) coarse-grained, on the order of 50 $\mu$m, materials obtained from such processes are difficult to avoid. The first two of these problems contribute to lowering the electrical breakdown strength and hence the capacitor's reliability. Such breakdown could be caused by electrical short-circuiting due to conducting grain-to-grain contact or by dielectric instability due to a too thin intergranular layer. With respect to coarse-grained materials, such structures hinder the fabrication of GBBL capacitors using thin sheets (less than 1 mil) to achieve ultra-high capacity ($mF/cm^3$)

The titanate glass ceramics as described by Herczog exhibit dielectric properties of mixed phase materials with an optimum dielectric constant of 1200. This value is not high enough for high capacity applications such as required for miniature decoupling capacitors in computer systems. Furthermore, if these materials are heated in a reducing atmosphere, they become semiconducting, indicating the presence of the interconnected $BaTiO_3$ phase. They have expansion coefficients similar to $BaTiO_3$ and cannot be joined or integrated into a substrate with expansion coefficient matching that of silicon.

GBBL ceramic materials as opposed to glass-ceramic materials are known to use barium titanate ($BaTiO_3$) with different donor dopants in forming various types of ceramic capacitors having high capacitance. For example, U.S. Pat. No. 4,403,236 (Mandai et al) discloses boundary layer semiconducting ceramic capacitors comprising a semiconducting body in which grain boundaries on crystalline grains of the semiconducting ceramic body are made into an insulator. The ceramic composition consists of a large amount of a main component $(Sr/Ba)TiO_3$, which may be modified with another titanate or a zirconate, and at least one semiconductor doping agent such as Nb, and Mn. The composition may also contain an oxide such as $SiO_2$ and/or $Al_2O_3$. The grain boundary of the crystalline ceramic body may be made insulating by heat-treatment in an oxidizing atmosphere to diffuse an insulating agent such as an oxidizable metal or a metal compound into the boundaries. The ceramic body itself may be produced by mixing the raw materials, forming the mixture into shaped bodies and then firing the shaped bodies in a neutral or reducing atmosphere. The grain sizes of the ceramic body may be up to 250 $\mu$m.

U.S. Pat. No. Re. 29,484 (Utsumi et al) discloses a ceramic composition containing $BaTiO_3$ as the basic composition which may also contain from 0.1 to 10 mol% of $Nb_2O_5$ and other oxides, including $Al_2O_3$. These materials are high dielectric constant materials and may be used as ceramic capacitors. The materials are formed by admixing the raw materials in a ball mill, pre-sintering, further ball mill mixing, pressure-molding into disks and then sintering.

U.S. Pat. No. 4,096,098 (Uneya et al) also describes a semiconductor ceramic composition containing barium titanate having a certain amount of the barium substituted with lead and calcium, and a semiconductor-forming component such as Nb. The ceramic compositions are prepared by conventional ceramic processes, e.g., mixing the powdered components following by sintering. The compositions are useful as heating elements.

U.S. Pat. No. 4,283,753 (Burn) discloses a ceramic capacitor composed of a dielectric ceramic body having a high-temperature-firing granular barium titanate phase and a low melting intergranular phase. The ceramic body may contain a number of ions of differing valencies, including Nb, which enter the lattice on titanium sites. Monolithic capacitors comprising a laminar assembly of ceramic layers of the disclosed dielectric material and having one or more buried electrodes are also disclosed.

U.S. Pat. No. 4,535,064 (Yoneda) relates to a barium titanate ceramic composition having a high dielectric constant useful as a reduction-reoxidation type semiconducting capacitor. A ceramic compound such as $BaTiO_3$ is heated with an oxide of manganese and subjected to a reducing atmosphere to convert it to a semiconductor. Then, the semiconductor is heated in an oxidizing atmosphere to form a dielectric reoxidized layer on the surface of the semiconductor prior to application of electrodes. The ceramic compositions are stated to have a dielectric constant of as high as 15,000 and a grain size of as small as 1.0 to 1.5 $\mu$m.

U.S. Pat. No. 4,606,116 (Hennings et al) discloses a non-linear resistor having a ceramic sintered body based on a polycrystalline alkaline earth metal titanate doped with a metal oxide to produce an n-type conductivity wherein the body has electrodes located on oppositely located surfaces. The ceramic body is first sintered in a reducing atmosphere to make the sintered body semiconductive, then the grain boundary layers of the semiconductor grains of the polycrystalline grain structure are converted by the formation of high-ohmic oxide layers by re-oxidation.

U.S. Pat. Nos. 4,405,475, 4,405,478 and 4,405,480 (all to Murase et al) describe dielectric ceramic materials composed of primary and secondary ingredients which form a polycrystalline ceramic structure, and insulating substances diffused throughout the intergranular boundaries of the ceramic to increase relative dielectric constant. The primary ingredients of these boundary layer ceramics are $SrTiO_3$, $Nb_2O_5$ and $ZnO$, and the secondary ingredients include silica and alumina, which serve to make the crystal grains of the ceramics larger in size, i.e., from 60 to 120 $\mu$m. The insulating substances include oxides of lead, bismuth and boron.

U.S. Pat. No. 4,384,989 (Kamigaito et al) discloses a ceramic composition containing a semiconductive barium titanate, a doping element such as niobium, and an additive.

U.S. Pat. No. 4,362,637 (Matsuo et al) discloses grain boundary dielectric ceramic compositions useful as capacitors. The starting materials for producing these composition comprise $SrO$, $TiO_2$ and $Nb_2O_5$ and may contain other oxides.

The above patents disclosing variously constituted ceramic materials are manufactured by conventional ceramic processes, utilizing principles of densifying the crystallite materials by heating to sinter the crystallites. The sintering of the crystallites usually requires solid state diffusion, usually observed at high temperatures and accompanied by growth in the crystallite grain sizes.

Foss et al, in "Discrete Sedimented Decoupling Capacitor", *IBM Technical Disclosure Bulletin*, 26:1086–1087 (1983), disclose decoupling capacitors which may be mounted on an alumina or other packaging substrate bearing the decoupling capacitor as a thin firm high dielectric constant material. Barium titanate and high dielectric constant glass-ceramics are disclosed as suitable dielectric materials for the decoupling capacitor.

Crowder et al, in "Embedded Decoupling Capacitors For The Transverse Via Module", *IBM Technical Disclosure Bulletin*, 27:1556–1557 (1984) disclose eliminating discrete card or module chip circuit decoupling capacitors and integrating the capacitor as part of the substrate in a transverse via module for carrying semiconductor chips. This article also suggests integrating high dielectric layers (e.g., barium titanate) with standard ceramic layers in semiconductor chip packaging to improve effective decoupling capacitance.

U.S. Pat. No. 3,977,887 (McIntosh) discloses a high dielectric constant ceramic composition containing one or more polycrystalline materials (e.g., barium titanate and blends thereof such as bismuthniobate-barium titanate) and interstitial glass as a second essential component. The ceramic compositions are useful in multi-layer ceramic composites, and can be densified at relatively low sintering temperatures. The interstitial glass is a lead silicate based glass, essentially a ceramic frit, and forms an amorphous phase bonding the polycrystalline ceramic skeleton together, and also serving as a fluxing agent (liquid phase sintering) that permits the dense ceramic particles to be sintered at low temperatures. The compositions can be used as decoupling capacitors in multi-layer composite applications.

U.S. Pat. No. 4,234,367 (Herron et al) discloses glass-ceramic substrate carriers for mounting semiconductor or integrated circuit chips, including multi-layer substrates comprising a sintered glass-ceramic insulator and copper-based conductor pattern. These materials are useful for packaging semiconductor integrated devices and other elements. A number of metal oxides are disclosed as suitable crystallizable glass particles, including $\beta$-spodumene or $\alpha$-cordierite glasses. The particular process disclosed for making these materials includes an oxidation step which aids in removing polymeric binders from the multi-layer substrates.

U.S. Pat. No. 4,328,530 (Bajorek et al) discloses high capacitance semiconductor chip packaging structures which comprise an integrated ceramic carrier. Each of the conductive planes is composed of a single metallic sheet, sandwiched in the substrate with dielectric ceramic sheets to form stacked capacitor elements. The planar substrate comprises a stack of laminated ceramic sheets. The dielectric layers of the packaging structure may be composed of polyimide, glass, etc., and higher capacitances can be obtained by using glass-ceramic materials instead of pure alumina or mixtures of ceramics with ferroelectric materials or other high dielectric constant oxides.

The novel glass-ceramic material of the present invention described in detail hereinafter is particularly useful in chip packaging structures such as described in this '530 patent. In particular, the glass-ceramic materials of the present invention can be used within such a ceramic semiconductor chip packaging substrate to form a decoupling capacitor when placed between adjacent planes of conducting metal patterns, in particular between power planes of the multilayer substrate, and any number or all of the ceramic substrate layers or other high dielectric layers can be comprised of the material of the present invention. Thus, the disclosure of U.S. Pat. No. 4,328,530 is incorporated by reference herein, and will be referred to hereinafter with respect to specific embodiments.

U.S. Pat. Nos. 3,619,744 (Stephenson), 4,081,857 (Hanold, III), 4,086,649 (Hanold, III), 4,148,853 (Schuber), 4,158,219 (Payne et al), 4,459,364 (McSweeney et al), 4,469,747 (Sasaki et al), 4,528,613 (Stetson et al), and 4,616,289 (Itakura et al) all disclose types of multi-layer or monolithic ceramic capacitors employing barium titanate as a component.

Accordingly, due to the above-noted problems associated with known glass-ceramic and GBBL capacitors, room for improvement clearly exists, particularly in various practical applications employing capacitors.

SUMMARY OF THE INVENTION

An object of the present invention is to provide a novel glass-ceramic material and process for its manufacture which solves the aforementioned problems associated with GBBL capacitors by providing GBBL capacitors comprising fine grain barium and/or strontium titanate conducting grains surrounded by a thin uniform microcrystalline boundary phase.

Another object of the present invention is to provide a novel glass-ceramic GBBL capacitor material containing Ge, Si, Nb, Ta, V or other Group V elements to enhance the conductivity of the $BaTiO_3$ grains.

Still another object of the present invention is to provide novel glass-ceramic material for GBBL capacitors having a high dielectric constant at high and low frequencies, low dielectric loss tangent and a high DC resistivity.

A further object of the present invention is to provide a novel glass-ceramic material and process for its manufacture which can be used as a decoupling capacitor within a multi-layer chip packaging substrate.

Another object of the present invention is to provide a novel glass-ceramic capacitor material having the ability to be co-sintered with other glass-ceramic or ceramic substrates and the ability to match the low thermal expansion coefficients of other substrates.

Still another object of the present invention is to provide a novel glass-ceramic capacitor material comprising a fine grain microstructure with a uniform thin insulating layer at the grain boundary having a high dielectric constant at both high and low frequencies.

The above and other objects and advantages of the present invention are attained by a high dielectric constant glass-ceramic material comprising small conducting grains based on $BaTiO_3$ and/or $SrTiO_3$ on the order of about 0.5–10.0 $\mu m$ surrounded by a thin microcrystalline insulating barrier layer at the grain boundary about 0.01–0.10 $\mu m$ thick wherein the conductivity of the grains is enhanced by addition of about 0.1–4.0 mol% of a dopant selected from among Group V elements, Ge and Si substantially incorporated in the bulk lattice of the grains upon Ti sites.

In a preferred composition, the conducting grains comprise $BaTiO_3$ and the dopant is a Group V element, more preferably Nb.

The novel glass-ceramic material of the present invention is composed of large electrically conducting grains surrounded by smaller electrically insulating grains comprising a mixture of materials which are substantially stoichiometric compositions of large and small grains to which is added a suitable amount of a dopant for the larger conducting grains.

The novel process comprises:

(a) admixing about 40–65 total wt % BaO and/or SrO, about 20–35 wt % $TiO_2$, about 0.1–4.0 wt % of a dopant selected from among Group V elements, Ge and Si, about 10–15 wt % $SiO_2$, about 6–12 wt % $Al_2O_3$, about 0–2 wt % MgO, and 0–3 wt % $Li_2O$, by a powder mixing process to obtain a homogeneous powder mixture;

(b) melting the powder mixture in a crucible or like vessel at a temperature of about 1500° to 1600° C. for about 1 to 4 hours to form a melt;

(c) quenching the melt by pouring it on a quench plate or into water to form glass cullets;

(d) crushing the glass cullets to obtain a powder mixture sufficiently fine to pass through a 325 mesh screen;

(e) admixing and milling the powder mixture for about 10 to 30 hours to obtain a dry glass powder mixture of average particle size of about 2 to 7 $\mu m$;

(f) pressing the dry glass powder in a die at a pressure of about 5,000–15,000 lbs. to obtain a green compact;

(g) firing the green compact to sintering temperatures sufficient to accomplish sintering or coalescence of glass particles and conversion to a glass-ceramic by crystallization.

In an alternate embodiment of the novel process, the pressing step (f) above wherein a green compact is formed may be a multilayer substrate fabrication process to form green sheets which are then subjected to firing step (g). The multilayer substrate fabrication process is described in detail hereinafter.

BRIEF DESCRIPTION OF THE DRAWINGS

FIG. 1 is a scanning electron micrograph (SEM) of a commercial grain boundary barrier layer capacitor formed by conventional glass-ceramic technology based on $BaTiO_3$.

FIG. 19 is an example of a comparative structure that is not representative of barrier layer material.

DETAILED DESCRIPTION OF THE INVENTION

Figure 2:
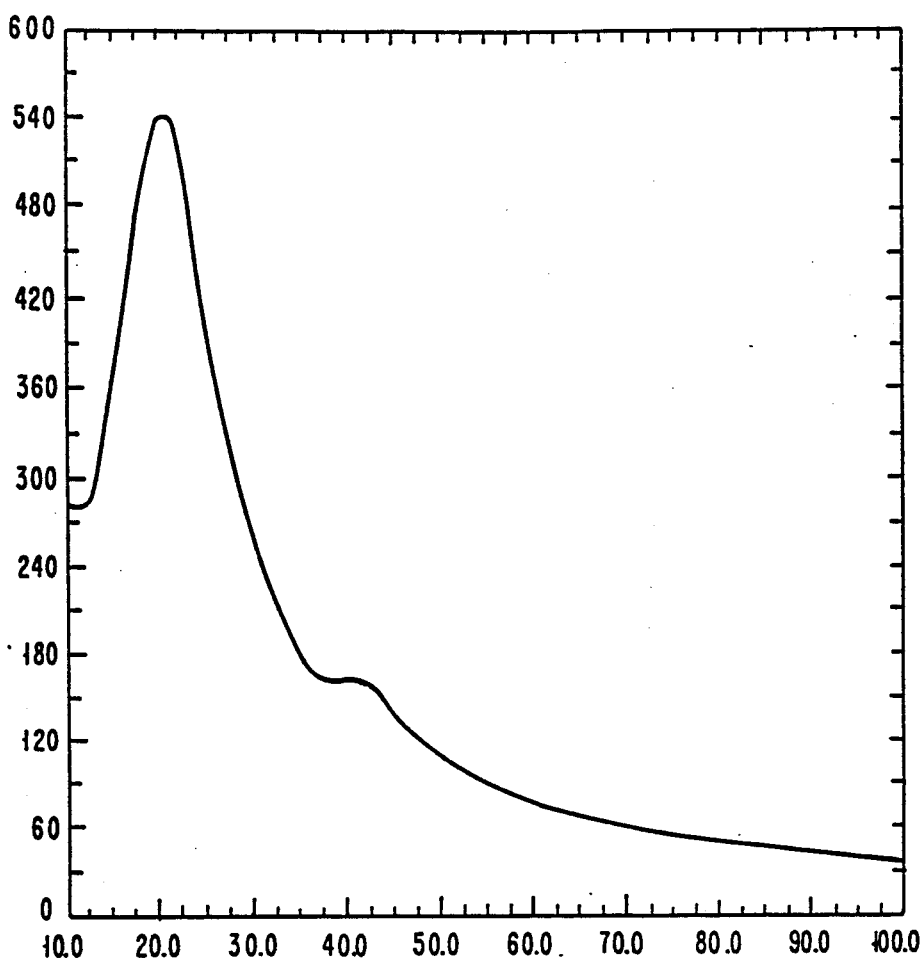
FIG. 2 is a graph depicting an X-ray diffraction pattern of glasses prepared in accordance with the Examples described in this specification.

In the process of the present invention, the microcrystalline insulating boundary phase of the glass-ceramic material is formed during firing step (g), which includes crystallization steps. In the first crystallization step, the uncrystallized glass separates out from the large crystallite particles into the grain boundary phase. This grain boundary glass then crystallizes into smaller crystallites during the second crystallization step. These steps are conducted in a reducing atmosphere where the larger crystallites are made semiconducting because of the reducible titanate and the presence of substitutional Nb or another suitable dopant on the Ti sites. The surrounding boundary layer crystallites are insulating because titanate crystals are essentially absent. The cooling process in air (or other oxidizing atmosphere) serves to insure a highly insulating boundary phase but the larger crystallites remain semiconducting due to the presence of the substitutional dopant on the Ti sites in these titanate crystallites. This results in a unique glass-ceramic high dielectric constant and low loss dielectric suitable for capacitors, comprising doped conducting grains about 0.5 to 10.0 μm in diameter surrounded by a thin (0.01 to 0.10 μm) and evenly distributed microcrystalline boundary phase.

The conducting grains comprise crystalline $BaTiO_3$ and/or $SrTiO_3$ (formed in situ) wherein Ti sites on the crystal lattice are substituted with a donor dopant, preferably Nb, but other Group V elements (e.g. Ta, V, etc.) could be used, as long as they are capable of contributing an extra electron to the $BaTiO_3$ or $SiTiO_3$ grains to enhance conductivity.

The microrystalline barrier layer is a thin insulating layer surrounding the conducting grains and may be composed of various materials including β-eucryptite ($Li_2O.Al_2O_3.2SiO_2$), barium aluminum silicate, etc., and its chemical composition will be understood to be dependent on the various metal oxides that are used as starting ingredients in the process. Barium or strontium titanate is crystallized in situ from a preferred starting mixture selected from BaO, SrO, $TiO_2$, $SiO_2$, $Al_2O_3$, $Li_2O$, MgO, $Na_2O$, $K_2O$ and the donor dopant which is selected from among Group V elements, Ge and Si, preferably a Group V element, more preferably niobium in oxide form, most preferably $Nb_2O_5$. A preferred starting mixture would comprise 40–65 wt % BaO, 20–35 wt % $TiO_2$, 0.1–4.0 wt % $Nb_2O_5$, 10–15 wt % $SiO_2$, 6–12 wt % $Al_2O_3$, up to 2 wt % MgO, and up to 3 wt % $Li_2O$. Using these preferred starting materials, the microcrystalline insulating layer surrounding the Nb-substituted $BaTiO_3$ conducting grains would comprise β-eucryptite or barium aluminum silicate using excess Ba and no $Li_2O$ or MgO, respectively.

In addition, minor constituents, such as CaF or other fluorides may be present in the glass to provide the resulting material with the desired properties. Fluorides, for example, in small amounts (such as 1–2 wt % in the starting mixture) lower viscosity at the crystallization temperature and enhance grain growth. The available fluorine ions substitute for oxygen in the BaTiO lattice. Other common constituents such as copper ion as a modifier, and conventional substitutions used for shifting the Curie point in ceramic $BaTiO_3$ materials (e.g., Zr for Ti) are not always effective in glass-ceramic materials in accordance with the present invention since, if added, they may crystallize in a different phase.

The unique glass-ceramic materials in accordance with the present invention are produced by the process described in greater detail hereinafter. However, the basic departure of the present invention from conventional glass-ceramic technology (illustrated in, e.g., the Herczog article mentioned above), is that after formation of the glass melt and rapid quenching to solidify to a glass, a regrinding and mixing process (steps (d) and (e)) is used to form green compacts/sheets which then undergo controlled heat-treatment in controlled atmospheres (firing step (g)). In the firing step, the first oxidation heating step burns off all carbonaceous material; the first crystallization step forms a dense, pore free glass and separates out the uncrystallized glass components from the barium/strontium titanate crystallities; the second crystallization step crystallizes the glass boundary material. Thereafter, the large crystallite conducting grains remain semiconductorizing by cooling in an oxidizing atmosphere. Thus, in accordance with the process of the present invention, a thin, uniform microcrystalline insulating grain boundary phase is formed over the donor-doped barium titanate grains and the thickness of the microcrystalline insulating barrier layer can be precisely controlled in uniformity to about 0.01 –0.1 μm.

The glass-ceramic materials of the present invention are produced by the following steps:

(a) Admixing about 40–65 total wt % BaO and/or SrO, about 20–35 wt % $TiO_2$, about 0.1–4.0 wt % of a dopant selected from among Group V elements, Ge and Si, about 10–15 wt % $SiO_2$, about 6–12 wt % $Al_2O_3$, about 0–2 wt % MgO and about 0–3 wt % $LiO_2$ by a powder mixing process to obtain a homogenous mixture. Preferably, the powder mixing process is a ball mill process. The dopant is preferably selected from among Nb, Ta, V and other group V elements having a valence of 5, and is most preferably Nb used in the form of its oxide, $Nb_2O_5$. Additional optional starting ingredients include $Na_2O$ or $K_2O$ which may be substituted for $Li_2O$, and small amounts of CaF or other suitable fluorides.

(b) Melting the powder mixture in a crucible or like vessel at a temperature of about 1500°–1600° C. for about 1–4 hours to form a melt. Preferably, the crucible is formed of platinum or a platinum alloy suitable for withstanding such high temperatures.

(c) Quenching the melt by pouring it on a quench plate or into water to form glass cullets. Preferably, the plate is a 1½ inch thick aluminum plate.

(d) Crushing the glass cullets to obtain a powder mixture sufficiently fine to pass through a 325 mesh screen. This step may be suitably done in a mortar and pestle.

(e) Admixing and milling the powder mixture for about 10–30 hours to obtain a dry glass powder mixture of average particle size about 2–7 μm. Again, this admixing and milling is suitably performed in a ball mill or a similar milling process.

(f) Pressing the dry glass powder in a die at a pressure of about 5,000–15,000 lbs. to obtain a green compact. The die may be a 1½ inch stainless steel die in preferred embodiments, and where laminated green sheets are desired rather than a green compact, a multilayer substrate fabrication process is used (described below).

Figure 6:
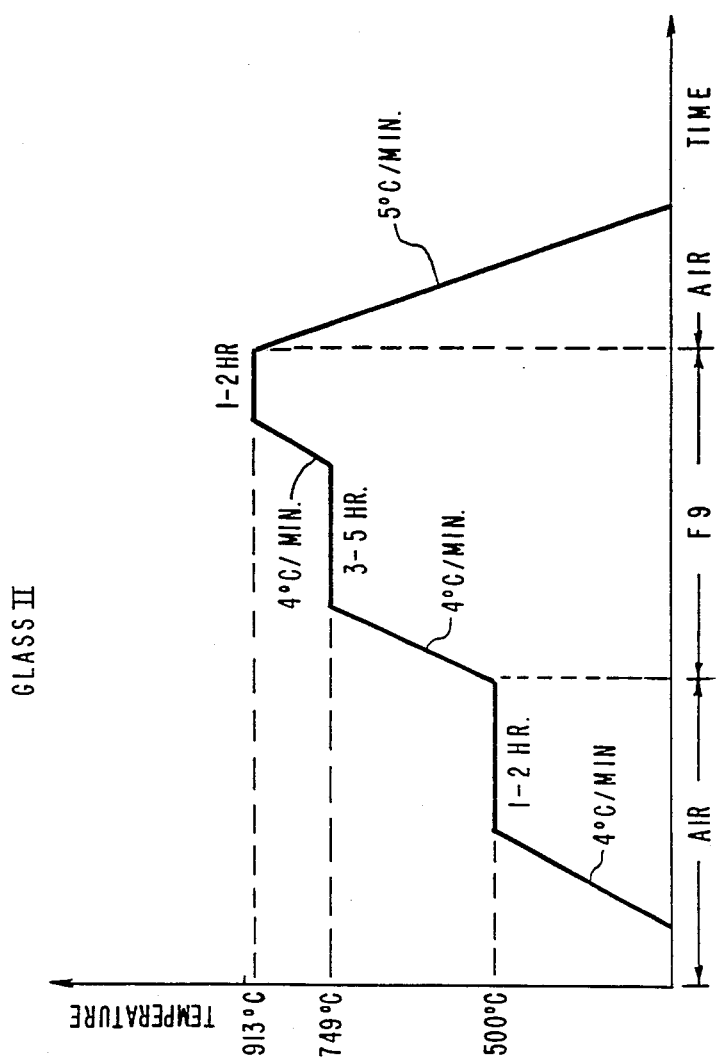
FIG. 6 shows a typical heat treatment profile used to fire the green compacts or green sheets to form glass-ceramics.

(g) Firing the green compact to sintering temperatures sufficient to accomplish sintering or coalescence of glass particles and conversion to a glass-ceramic by crystallization. This firing step typically follows a firing schedule such as shown in FIG. 6, described further below. A typical firing profile includes heating the green compact or green sheets at a rate of about 3°–5° C./min. in air (or other oxidizing atmosphere) to a holding temperature of about 500° C. The green compact/laminate is held at this temperature for about 1–2 hours. The air ambient is then switched to a forming gas (e.g., about 5–10% $H_2+N_2$) ambient at which point the heating is again elevated at a rate of about 3°–5° C./min. to the coalescence or densification and first crystallization temperature of the glass (e.g., about 749° C. for glass II described in the Examples hereafter), which temperature is held for about 3–5 hours. Thereafter, the temperature is again increased at a rate of about 3°–5° C./min. to the second crystallization temperature of the glass (e.g., about 913° C. for glass II), which temperature is then held for about 1–2 hours. The thus-formed glass-ceramic is cooled in an air (or other oxidizing atmosphere) to room temperature at a rate of about 4°–6° C. per minute.

While a typical firing schedule for the present glass-ceramic dielectric will generally follow the above heat-treatment pattern, it will be understood by one of ordinary skill in the art that the exact densification and crystallization temperatures and holding times will vary to some extent based on the particular material being fired. Thus, the firing step is most suitably defined in functional terms, i.e., firing according to a heat-treatment profile sufficient to accomplish binder removal (when firing laminates or green sheets formed by a multilayer substrate fabrication process), sintering or coalescence of the glass particles, and conversion to a glass-ceramic by successive crystallizations as described above.

In an alternate embodiment of the process, the pressing step (f) above wherein a green compact is formed is replaced by a multilayer substrate fabrication process to form green sheets or laminates which are then subjected to the above-described firing step (g). In this multilayer substrate fabrication process, the dry glass powder particles are ground to an average particle size in the range of about 2–7 $\mu$m. This grinding can be suitably accomplished in two steps, a preliminary dry or wet grinding to 400 mesh particle size followed by further grinding with suitable organic binders and solvents until the average particle size is reduced to lie between about 2–7 $\mu$m and a castable slurry or slip is obtained. A single stage prolonged grinding of the cullet in the medium of the binder and solvent, until the desired particle sizes are obtained, can also be used. In the latter case, a filtering step may be necessary to remove oversized particles.

By way of example, a suitable binder is polyvinylbutyral resin with a plasticizer such as dipropylglycoldibenzoate (e.g. the commercial Benzoflex plasticizer of the Tennessee Products and Chemical Corp). Other suitable polymers are polyvinyl acetate, selected ones of the acrylic resins, and the like. Similarly, other suitable plasticizers such as dioctylphthalate, dibutyl phthalate, and the like, can also be used.

The purpose of adding an easily evaporable solvent is (1) to initially dissolve the binder so as to enable it to coat the individual glass particles, and (2) to adjust the rheology of the slip or slurry for good castability. A particularly effective solvent for this purpose is the dual solvent systems of U.S. Pat. No. 4,104,245, specifically the dual methanol/-methyl isobutylketone (in a $\frac{2}{3}$ weight ratio) solvent system.

The slip or slurry prepared as above is cast, in accordance with conventional techniques, into green sheets (e.g. about 25–250 micrometers (1–10 mils) thick), preferably by doctor-blading techniques.

A plurality of green sheets, prepared as above, are laminated together in a laminating press.

The temperature and pressure employed for lamination should be sufficient to cause the individual green sheets to bond to each other to yield a monolithic green substrate. The green substrate is then subjected to the same firing step (g) as for the green compact mentioned above according to a suitable firing schedule to form a glass-ceramic. Firing should be conducted so as to accomplish binder removal when this embodiment of the process is employed.

The glass-ceramic GBBL capacitors of the present invention are useful in a variety of practical applications. For example, the materials may be used to form high capacitance capacitors suitable for use at low frequencies to 100K cycles.

A preferred practical application for the glass-ceramic materials of the present invention is within a ceramic (e.g., glass-ceramics such as spodumene and cordierite glass-ceramics) semiconductor chip packaging substrate. In this type of application, the present glass-ceramic capacitor materials may be used in several specific ways as a dielectric material. For example, in a multi-layer ceramic-type chip carrier, such as described in the above-noted U.S. Pat. No. 4,328,530, incorporated by reference herein, the present glass-ceramic materials may form a decoupling capacitor between adjacent planes of conducting metal patterns (in particular between power planes) of a multi-layer stacked capacitor laminate.

In a structure wherein the GBBL capacitor is embedded within the chip packaging substrate, the GBBL material layer has a thickness from about 0.25 to about 5 mils, preferably from about 1 to about 2 mils. The low dielectric constant ceramic layers in the laminate have a thickness from about 2 to about 15 mils, preferably from about 7 to about 8 mils. The GBBL layer has power or ground planes on either side thereof. To provide the maximum decoupling effect the GBBL layer is preferable close to the substrate surface to which the chip is attached. In this situation conducting vias, which electrically connect the chip I/O to signal lines within the substrate, pass through the power planes, ground planes and GBBL layer. To avoid parasitic capacitance on these vias because of the high dielectric constant GBBL layer the vias where they pass through the GBBL layer are surrounded by a skin of the dielectric constant material having a finite thickness of less than about 5 mils preferably 1 to 2 mils. This skin is achieved by laminating two green lower dielectric constant ceramic layers with conducting paste filling the throughholes in the layer and forming the voltage or ground plane. The green GBBL layer is disposed between the conducting paste covered surfaces of the high dielectric constant layers. Throughholes in the GBBL layer are not filled with conducting paste. Throughholes in the GBBL layer are aligned with conducting paste filled throughholes in the low dielectric constant ceramic layers. The throughholes in the GBBL layer is larger than the throughholes in the high dielectric constant ceramic layers. As the layers are laminated and densified the conducting paste and low dielectric constant ceramic material are pushed into the throughhole in the GBBL layer to form a conducting via surrounded by the low dielectric constant material.

The present glass-ceramic materials are also useful in multi-layered substrates comprised of glass-ceramic insulators and copper-based conductor patterns which are useful for mounting semiconductor integrated circuit chips as described in the above-noted U.S. Pat. No. 4,334,367, also incorporated by reference herein. That is, the present glass-ceramics can form the insulating layers in such substrates. The present glass-ceramic materials are also co-sinterable with the glass-ceramic materials disclosed in the '367 patent forming the remainder of the insulating substrate layers. It is understood that the oxidizing ambients should be chosen such that the copper metal is not oxidized but that the ambient is oxidizing to carbon and titanium.

Figure 20:
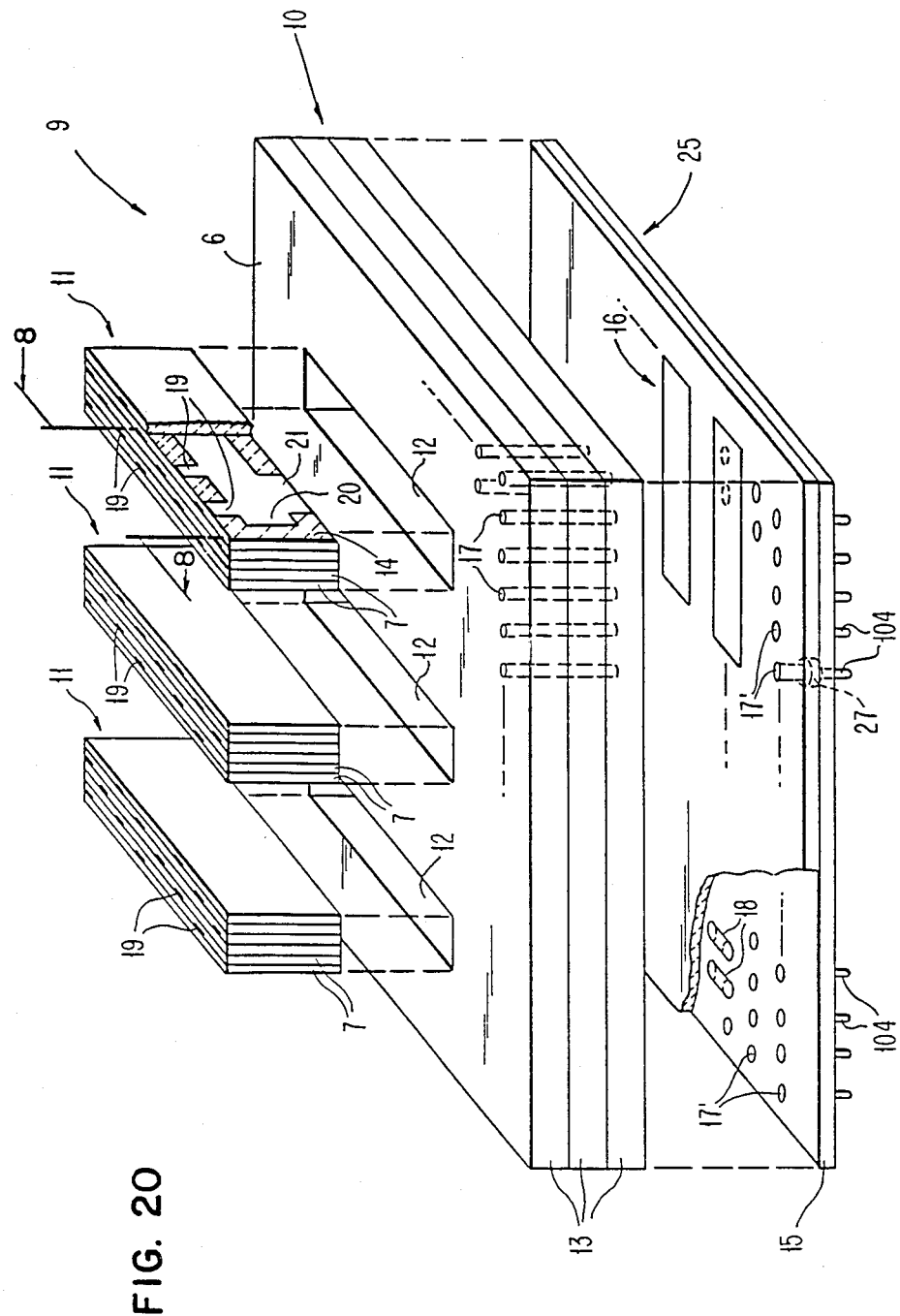
FIG. 20 is an exploded perspective view of an integral chip carrier module.

A specific manner in which the present glass-ceramic capacitor materials may be used to form an improved high capacitance multi-layer chip packaging structure providing voltage decoupling capability will be described below with reference to a specific embodiment of the aforementioned U.S. Pat. No. 4,328,530 for the basic structural details. Referring to FIG. 20, an exploded perspective view of an integral chip carrier module 9 with the chip and upper layers (including the ground plane plate and layers above it) is shown. A laminated ceramic substrate 10 is composed of a stack of horizontally oriented ceramic or glass-ceramic sheets 13. This substrate 10 provides the bulk of the basic support for the structure. Several slots 12 are provided in the substrate 10 extending through from the top to the bottom of the stack 10 of sheets 13. A plurality of sets of vertically oriented capacitor stacks 11 are inserted into the slots 12. These vertical capacitor stacks 11 function to provide power supply connections between the upper and lower portions of carrier 9. Carrier 9 also includes signal and power vias and pins for external connection.

Figure 21:
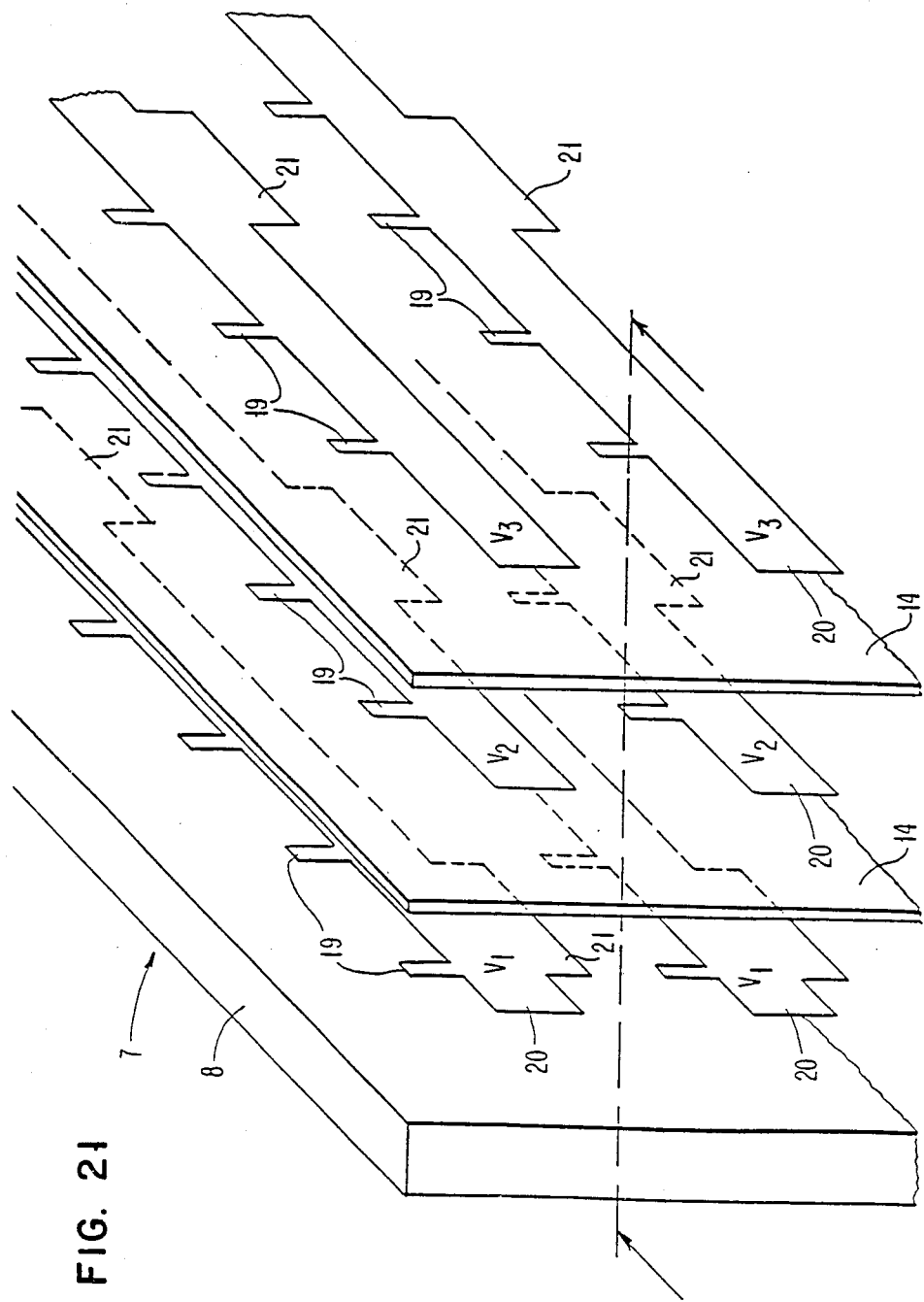
FIG. 21 depicts a laminated structure composed of multiple laminates of ceramic substrates carrying alternating layers of metallic power plane conductors and ceramic or dielectric sheets.

Stacks 11 are laminated structures, each of which is composed of multiple laminates 7 each stack comprising ceramic substrates carrying alternating laminated layers of metallic power plane conductors 20 and ceramic or dielectric sheets 14 (see FIG. 21). These ceramic sheets 14 alternating with the adjacent planes of conducting metal patterns 20 may be formed of the present glass-ceramic materials to form a decoupling capacitor. Additionally, the present glass-ceramic materials may be co-sintered with the ceramic sheets. The stacks of laminates 7 in capacitor stack 11 are oriented so their edges extend vertically when they are inserted within the slots 12 in substrate 10. The horizontal sheets 13 in stack 10 of ceramic or glass-ceramic material also include an array of vias 17.

The lower stack 25 of laminated horizontal sheets 15 located below substrate 10 and parallel to sheets 13 in the chip carrier module of FIG. 20 is unslotted. Upon the uppermost sheet 15 of stack 25 is deposited an array of metallization straps 16 adapted to electrically interconnect the lower tabs 21 of the various metallic power supplying power planes 20 in laminates 7 for distribution of electrical power from straps 16 up to the power planes 20 which connect electrically to the chips. Other aspects of the chip carrier modules shown in FIG. 20 are known structural features to one of ordinary skill in the art, including vias 17, conventional pins 104 connected to metal pads 27, distribution metallization tabs and metallic tabs 19 on the top of the power planes 20 and dielectric (glass-ceramic or ceramic) interface.

Other details of the structure and suitable processes for manufacturing the materials useful in a chip carrier module such as described above are disclosed in U.S. Pat. No. 4,328,530, and it will be understood that the variously modified constructions described therein are also suitable embodiments for utilizing the present glass-ceramic materials as substitutes for the ceramic dielectric materials disclosed in the '530 patent, or which may be co-sintered with the ceramic or glass-ceramic dielectric materials of the '530 patent.

Other practical applications for the glass-ceramic material of the present invention include a high capacity discrete capacitor for use at high frequencies, and a discrete, high frequency capacitor joined by solder balls to a module as described in U.S. Pat. No. 4,349,862. In this case, expansion coefficient matching to the module is not essential as it is in the integrated capacitor application.

The novel material and process for its manufacture in accordance with the present invention will now be described in further detail with reference to the following specific examples, which are not intended to limit the scope of the present invention in any manner whatsoever.

Examples

Glass-ceramic compositions I, II and III were prepared as follows from reagent grade (Alfa products) batch materials. The three glass-ceramic compositions were prepared from the starting ingredients shown in Table I on page 25.

TABLE I

| Comp. No. | Compositions for the Preparation of Glass-Ceramics | | | | | | | |
|---|---|---|---|---|---|---|---|---|
| | Content in Glass (wt. %) | | | | | | | |
| | BaO | TiO2 | Nb2O5 | SiO2 | Al2O3 | MgO | Li2O | CaF2 |
| I | 59.7 | 25.9 | — | 7.75 | 6.57 | — | — | 1.56 |
| II | 49.4 | 25.57 | 0.43 | 13.2 | 8.95 | 0.875 | 1.975 | — |
| III | 49.4 | 29.07 | 0.43 | 10.7 | 7.55 | 3.25 | — | — |

The initial ingredients in each of glass-ceramic compositions I, II, III were subjected to the same process steps to produce glasses. The resulting glass-ceramic I, without an Nb dopant, would correspond to a glass-ceramic composition in accordance with the Herczog article mentioned above, i.e., $BaTiO_3$ grains surrounded by a barium aluminum silicate grain boundary insulating layer, but the Herczog conventional glass-ceramic process (i.e., no regrinding or forming gas atmosphere in the firing step) was not used. Thus, glass-ceramic I represents a comparative example and its properties are shown in Table II:

TABLE II

| Comparative Properties of Glass Composition I | | |
|---|---|---|
| | w/o Nb | w/Nb |
| Cooled in air | like Herczog | Hi K |
| | Low K | Low Loss |
| | Low Loss | |
| Cooled in | Hi K | Hi K |
| Forming Gas | Hi Loss | Hi Loss |

Glass-ceramic II contains $BaTiO_3$ conducting grains and a $\beta$-eucryptite microcrystalline grain boundary phase, whereas glass-ceramic III is a comparative material comprised of an o-cordierite and $BaTiO_3$ mixed phase. In glass-ceramics II and III, approximately 0.25 mol% $Nb_2O_5$ was used to provide the necessary conductivity of the grains.

The initial glass powder mixture was obtained by admixing the starting ingredients for each composition through a ball mill process. About 100 grams of the mixed powders obtained for each sample were melted in a platinum crucible at 1550° C. for 3 hours. The crucible was taken out of the hot furnace and the melt poured and quenched on a ¼" thick aluminum plate without delay. The resulting glasses were then crushed and ground in an agate mortar, followed by ball milling for 20 hours. Green compacts were obtained by pressing the powders in a ¼" diameter stainless steel die under pressure of 10,000 lbs.

Crystallization heat-treatments were carried out on each sample in an atmosphere controlled box furnace (CNM rapid temp furnace) as described more particularly below. The resulting glass-ceramic compositions were prepared for electrical measurements by vacuum sputtering a thin layer of Au at both sides of the surfaces. The apparent dielectric constant (K) and dissipation factor (tan-δ) were measured by using an HP-4274 LCR meter over a wide range of frequencies (100 Hz 10 MHz). The precise DC resistivities were determined using an HP-4141B, PA meter/DC voltage source. Samples subjected to SEM investigation were prepared by mounting them in a fast curing acrylic, then polishing by diamond paste. Samples for TEM investigation were prepared by ion beam milling thin foil to obtain an area transparent to electrons.

Figure 3:
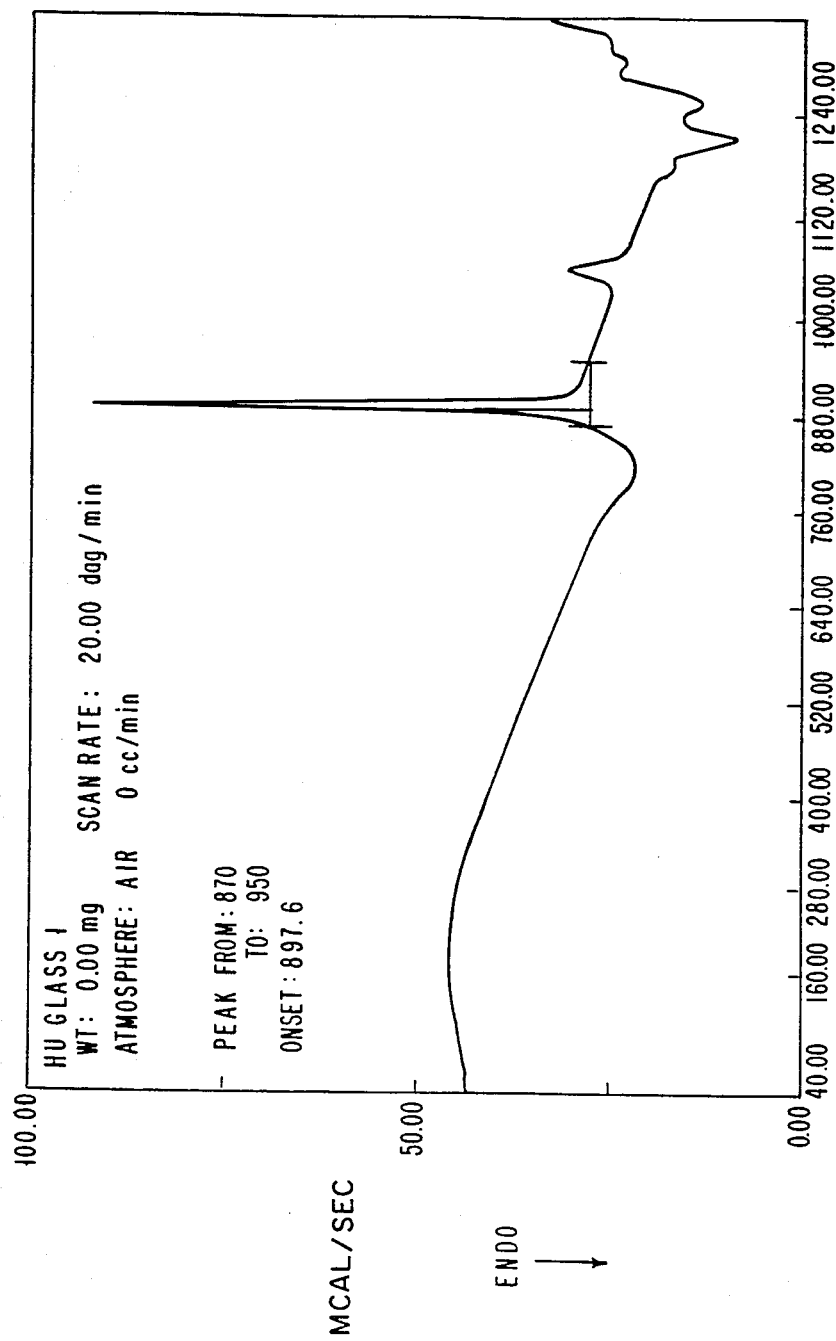
FIGS. 3–5 show differential thermal analysis (DTA) results for experimental compositions described in the following Examples.
Figure 4:
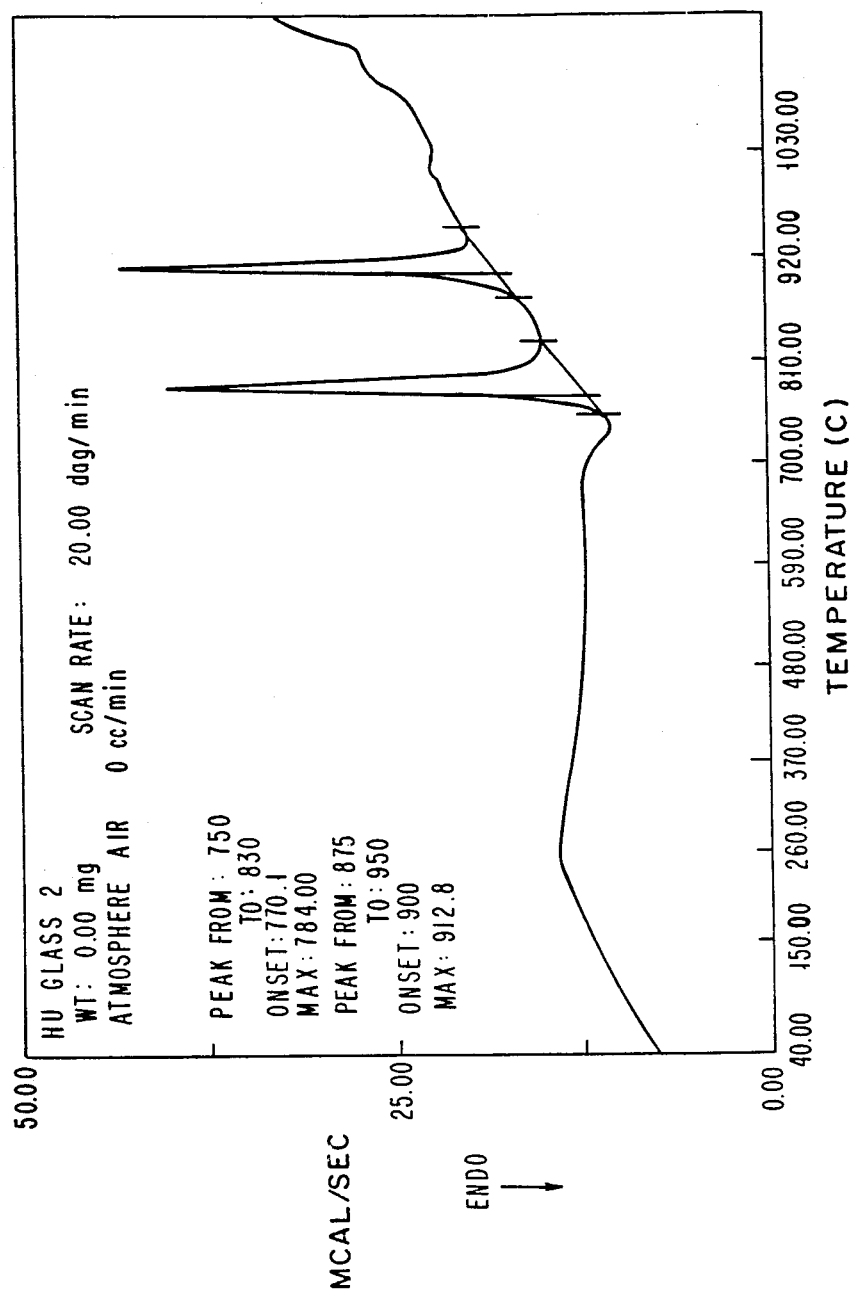
Figure 5:
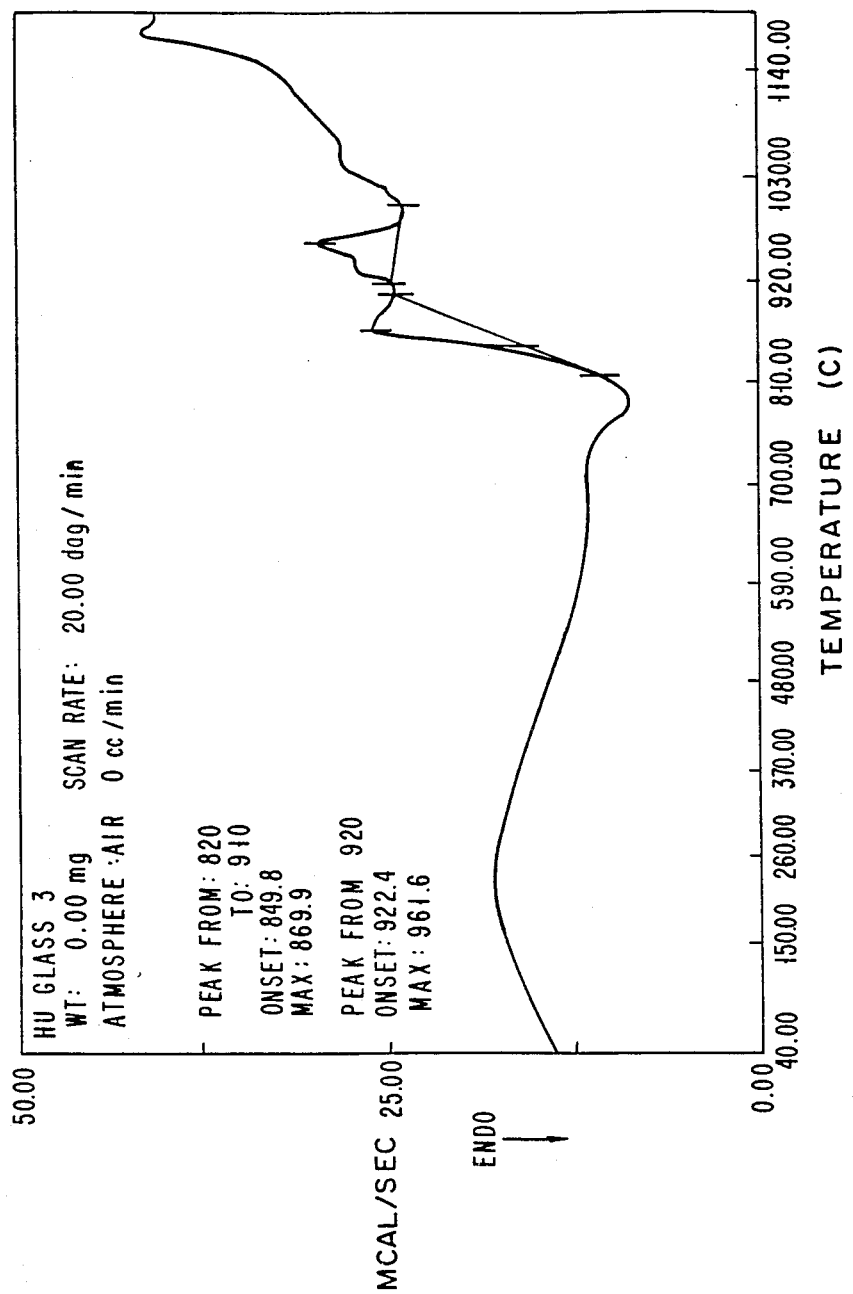

The green compacts obtained in the manner outlined above for each sample were subjected to densification and crystallization heat-treatments as outlined in FIG. 6. The crystalline phases produced by heat-treatment of the glasses were studied by differential thermal analysis (DTA) and X-ray powdered diffraction analysis. The DTA results of glass-ceramics I and II are shown in FIGS. 3 and 4, respectively. Both curves depict an endothermal process, with valleys corresponding to the glass softening temperatures. There were two exothermal peaks at 905° C. and 1060° C. in glass-ceramic I, and 2 exothermal peaks at 749° C. and 913° C. in glass II representing crystallization. FIG. 5 shows the DTA result for glass-ceramic III. It is believed that very complicated crystallization processes are involved in this type of glass composition since there is a wide temperature overlap between the two crystalline phases.

In FIG. 2, X-ray results obtained from X-ray diffractometer measurements typical of all glass compositions are shown. These X-ray results show that there are no distinguished crystalline lines apart from the broad band which has a peak value corresponding to a d-spacing of approximately 3.2 A. This peak value is a characteristic of a silicate vitreous material.

More particularly, for the crystallization heat-treatment, the glasses were heated up to the densification and first crystallization temperature at a rate of 4° C./min and held at the crystallization temperature for 3-5 hours, then heated up to a second crystallization temperature and held there for 1 hour. Finally, the materials were cooled down to room temperature at a rate of 5° C./min. Heat-treatments were carried out either in air or in a reducing/forming gas atmosphere (i.e., 10% $H_2$ and 90% $N_2$). An example of a typical heat-treatment profile for the present glass-ceramics is shown in FIG. 6.

Figure 7:
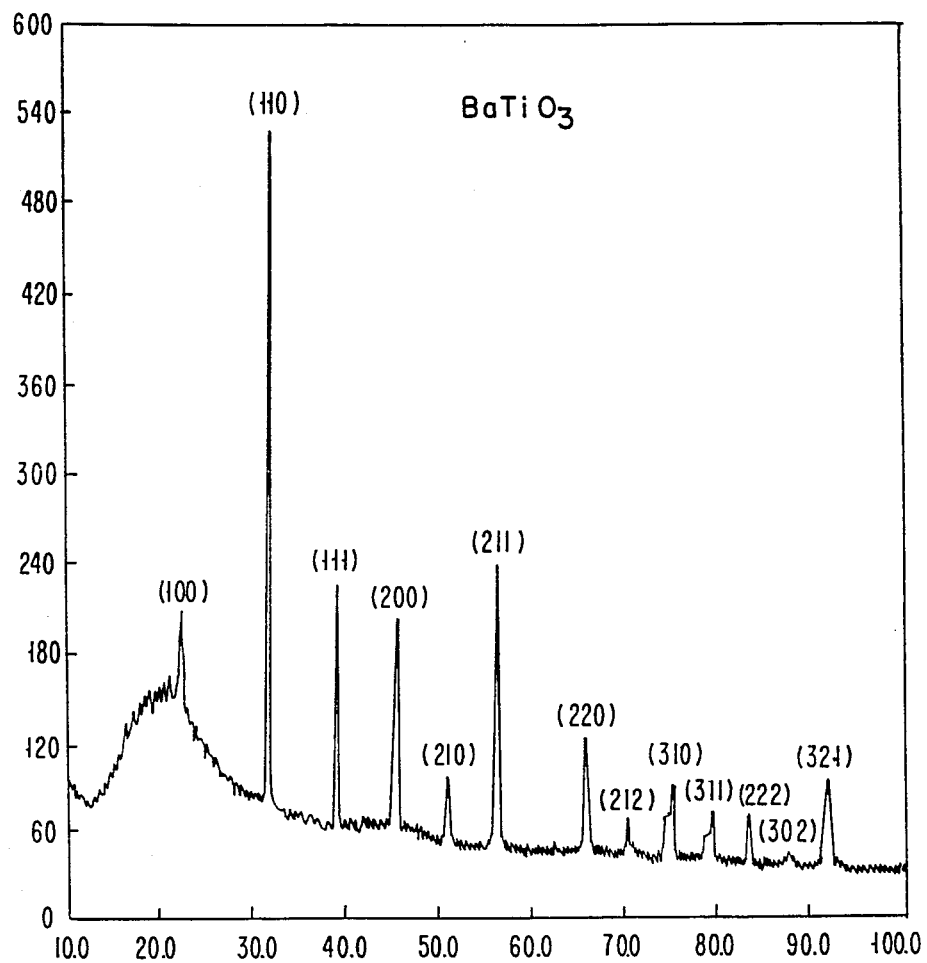
FIGS. 7–10 illustrate X-ray diffraction patterns of $BaTiO_3$ glass-ceramic compositions after various heat treatments.
Figure 8:
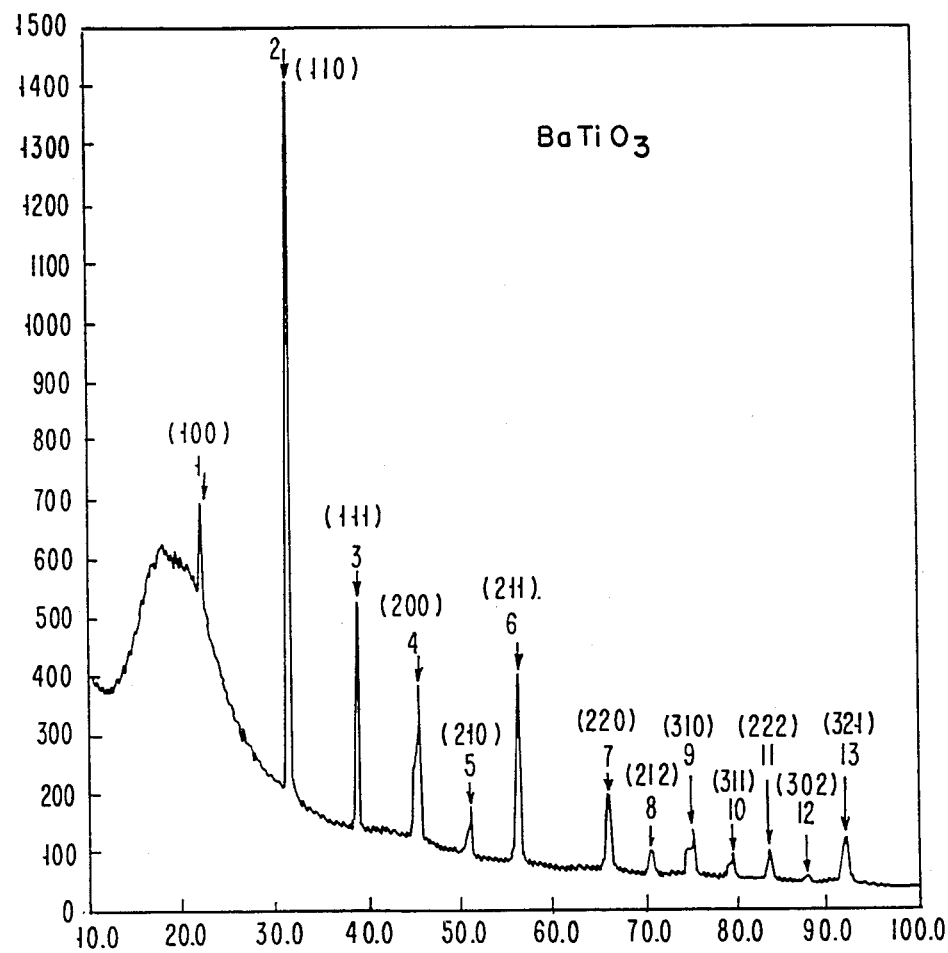
Figure 9:
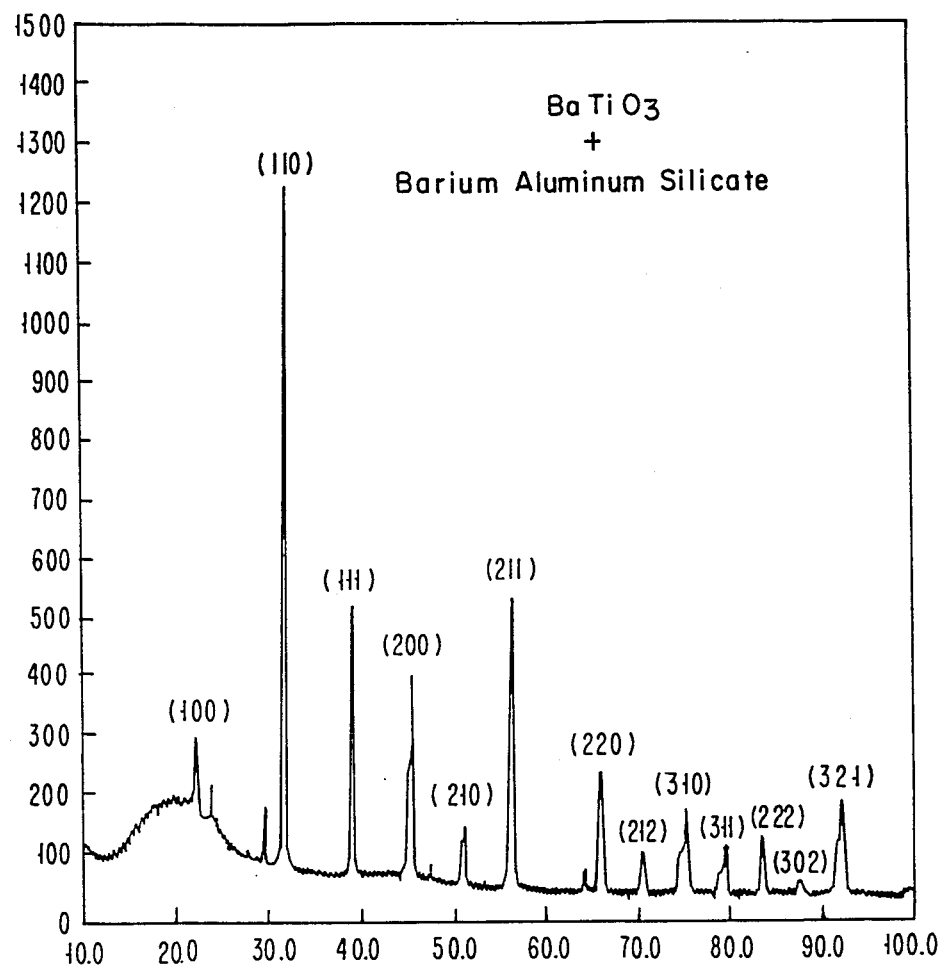
Figure 10:
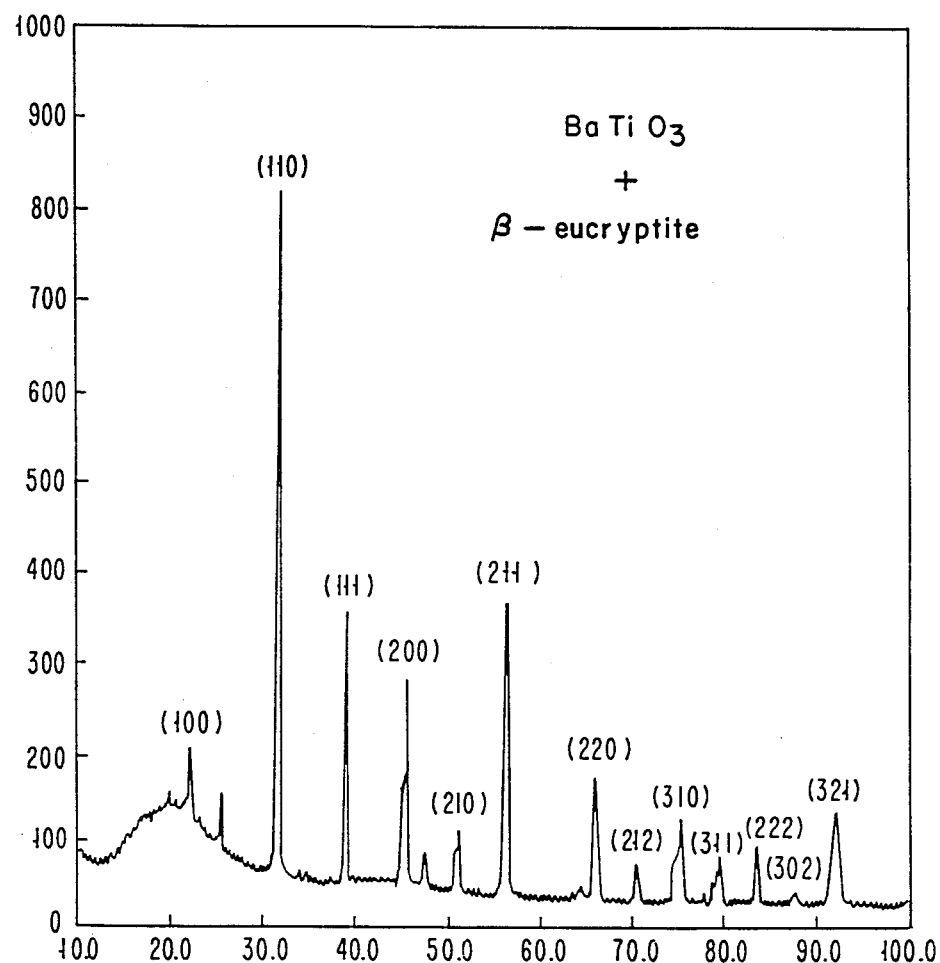

The presence of different crystalline phases were examined by X-ray diffraction. In both glass-ceramics I and II the major crystalline phase after first stage heat-treatment is $BaTiO_3$, see FIGS. 7 and 8. All of the diffraction peaks shown stem from the cubic $BaTiO_3$ structure. After second stage heat-treatment, some extra diffraction peaks in addition to the main $BaTiO_3$ diffraction peak correspond to barium aluminum silicate insulating phase for glass I and to the β-eucryptite insulating phase for glass-ceramic II. See FIGS. 9 and 10.

Figure 11:
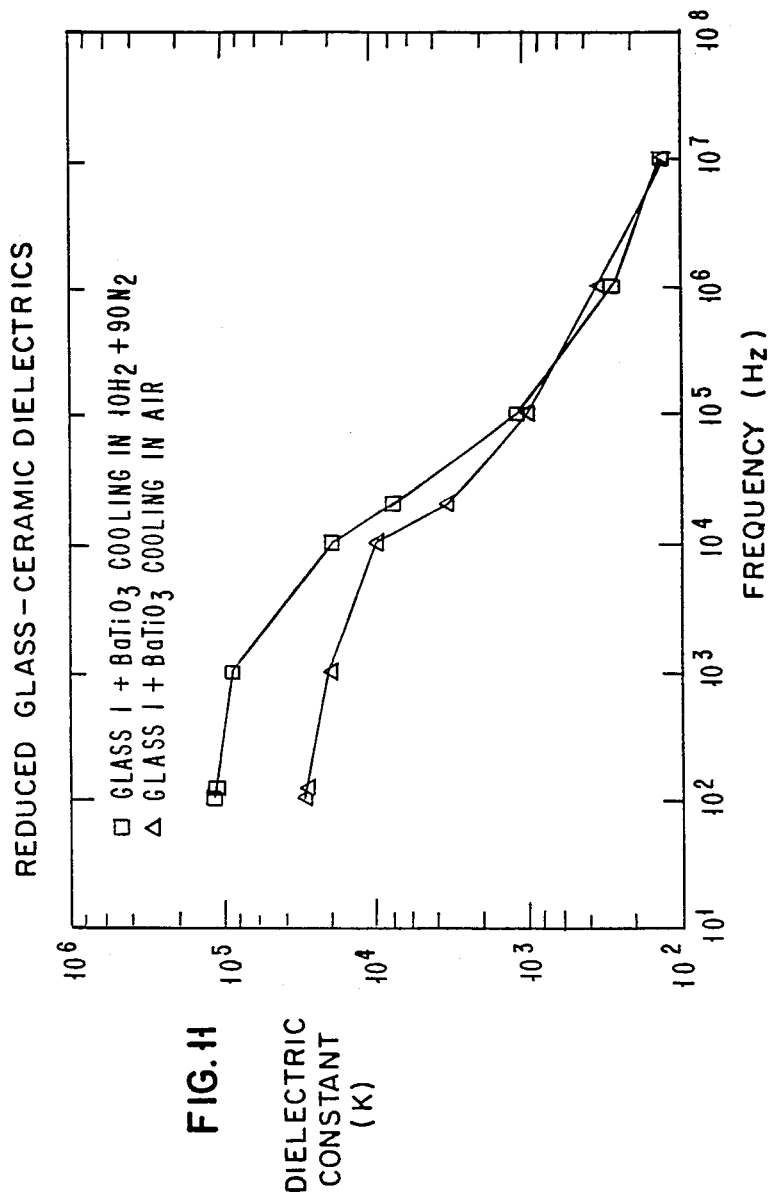
FIGS. 11–16 depict the experimentally obtained dielectric properties of barium titanate glass-ceramics with and without Nb doping under various heat treatment conditions.

The dielectric properties of barium titanate glass-ceramics (barium aluminum silicate insulating grain boundary phase) with and without Nb doping were studied with respect to heat-treatments. Glass-ceramic I was again prepared as above, but with and without Nb. The samples containing Nb employed $Nb_2O_5$ in a starting amount of 0.43 wt %. For samples with Nb, a significant dispersive behavior of the dielectric constant with respect to frequency is shown in FIG. 11. The cooling atmosphere and 5° C./min cooling rate does not have a significant effect on the dielectric constant. Very high dielectric constants (on the order of 40,000) occur at a frequency of 120 Hz, and decrease to 230 at 10 MHz for the sample cooled in air.

Figure 12:
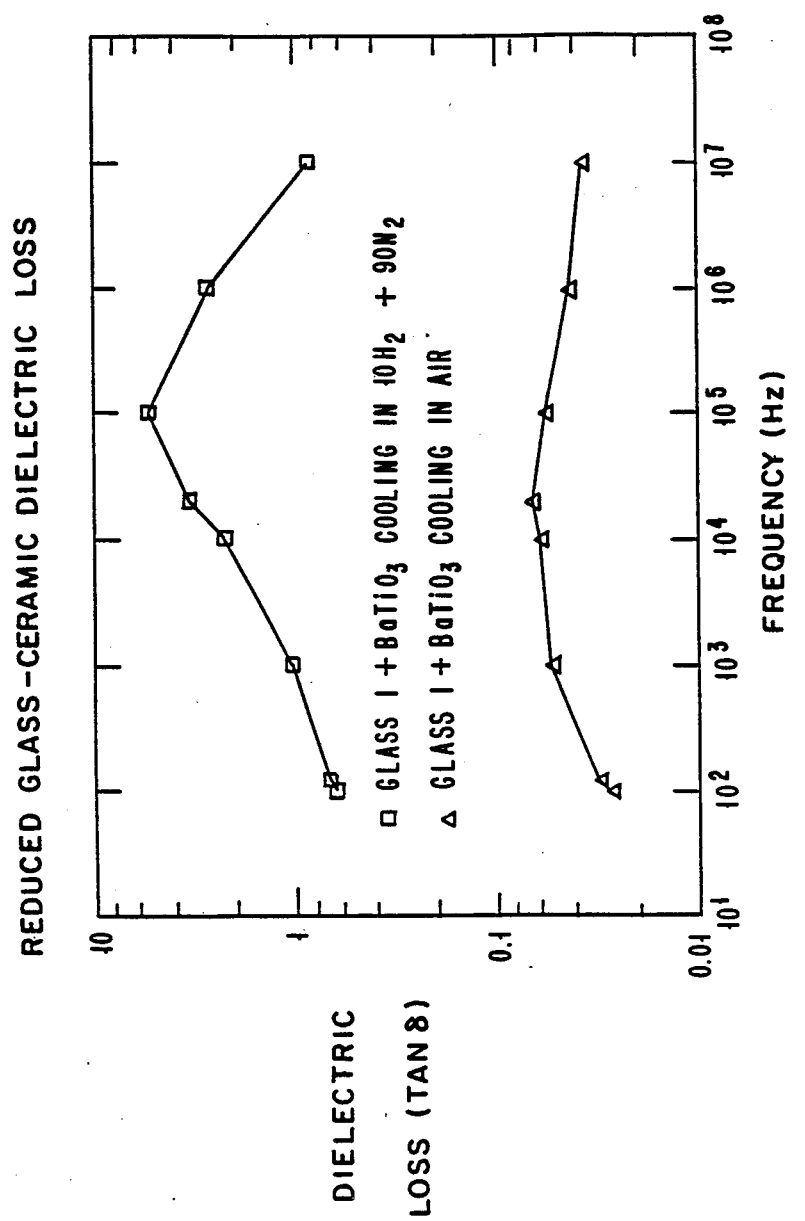
Figure 13:
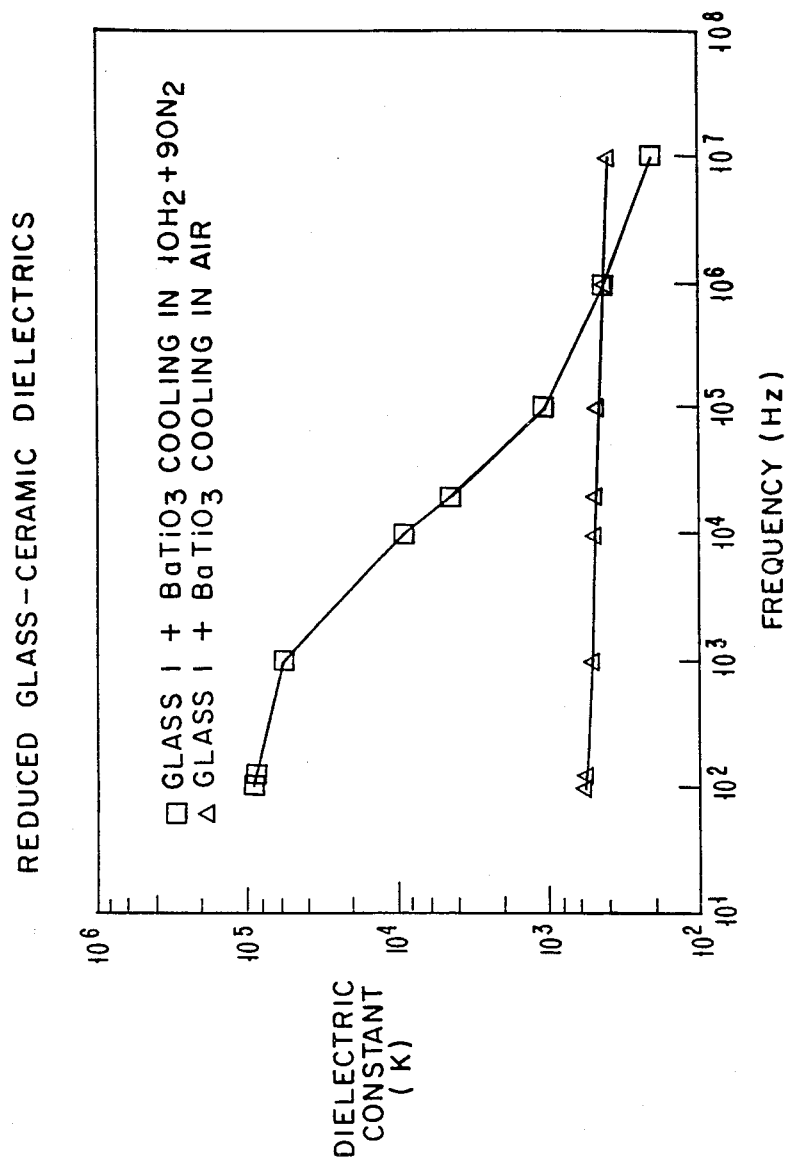
Figure 14:
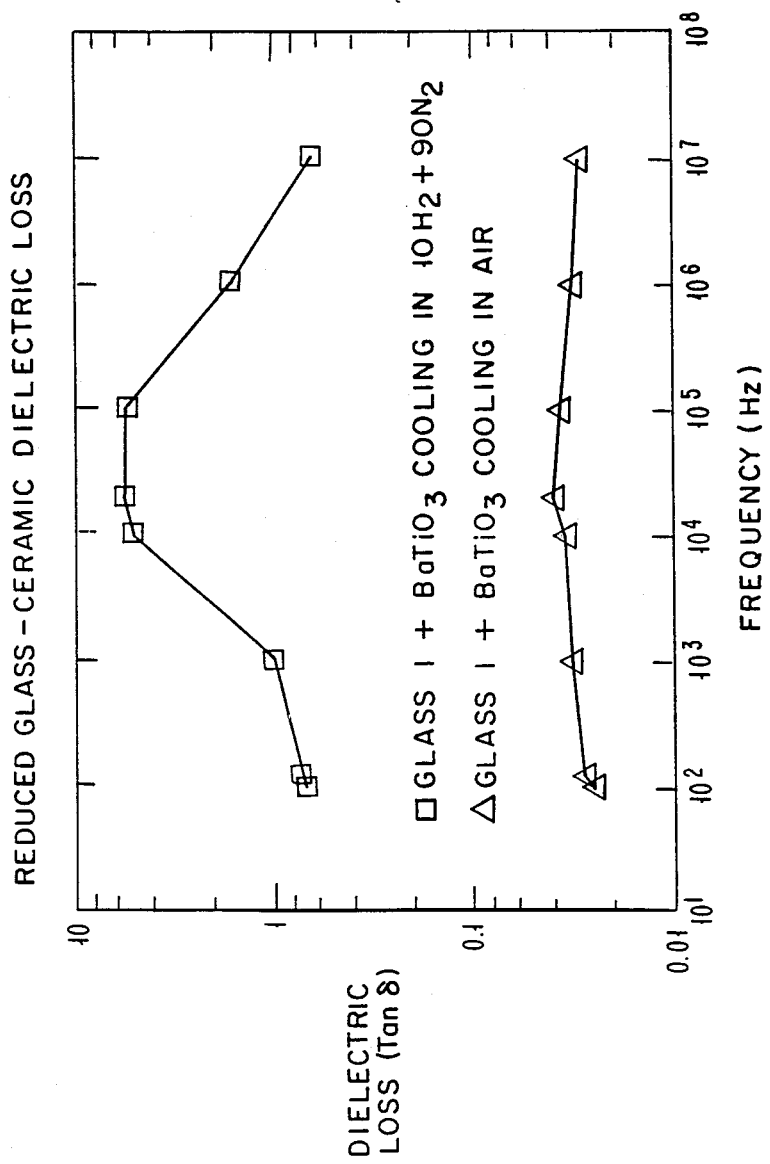

The dielectric losses are seen to have a strong dependence on the cooling atmosphere, as shown in FIG. 12. Dielectric loss reduces drastically from 6 to 0.04 when the Nb doped sample is cooled in air. However, with respect to samples lacking the donor dopant Nb, both dielectric constant and dielectric loss change significantly with the cooling atmosphere, as shown in FIGS. 13 and 14. For samples cooling in forming gas, the dispersive behavior of the dielectric constant versus frequency is clearly shown in FIG. 13, while the average dielectric constant is not a function of frequency for the sample cooled in air. The dependence of dielectric properties on the heat-treatment atmosphere could be related to the change in sample resistivity. In order to explain these phenomena, DC resistivities of $BaTiO_3$ with Nb, $BaTiO_3$ without Nb and barium aluminum silicate glass itself were measured separately, and are listed in Table III:

TABLE III

| | Resistivity (ohm—cm) of $BaTiO_3$ and Glass After Heat Treatment | | |
| --- | --- | --- | --- |
| | Cooling Processes | | |
| Sample | 10% $H_2$ + $N_2$ | $N_2$ | Air |
| $BaTiO_3$ with Nb | 2 Ω.cm | 8 Ω.cm | 10 Ω.cm |
| $BaTiO_3$ without Nb | 30 Ω.cm | $1.2 \times 10^5$ Ω.cm | $3.6 \times 10^7$ Ω.cm |
| Glass | $1.0 \times 10^{11}$ Ω.cm | $6.3 \times 10^{13}$ Ω.cm | $2.0 \times 10^{14}$ Ω.cm |

The resistivity of the glass phase is not very sensitive to the cooling processes. The significant role Nb plays in enhancing grain conductivity of $BaTiO_3$ grains is clearly indicated in the results shown in Table III. The Maxwell-Wagner two-layer model as described by C. G. Koops, "On the Dispersion of Resistivity and Dielectric Constant of Some Semiconductors at Audio Frequencies", *Physical Review* 83:121 (1951), based on conducting grains which are separated by more resistive boundary layers, can well explain the dispersive behaviors observed for the case of glass-ceramic I with Nb. The relative frequency independence of the dielectric constant of glass-ceramic I without Nb is due to the high grain resistivity. In this case, the space charged polarization phenomenon does not play a major role in contributing to the high dielectric constant.

Figure 15:
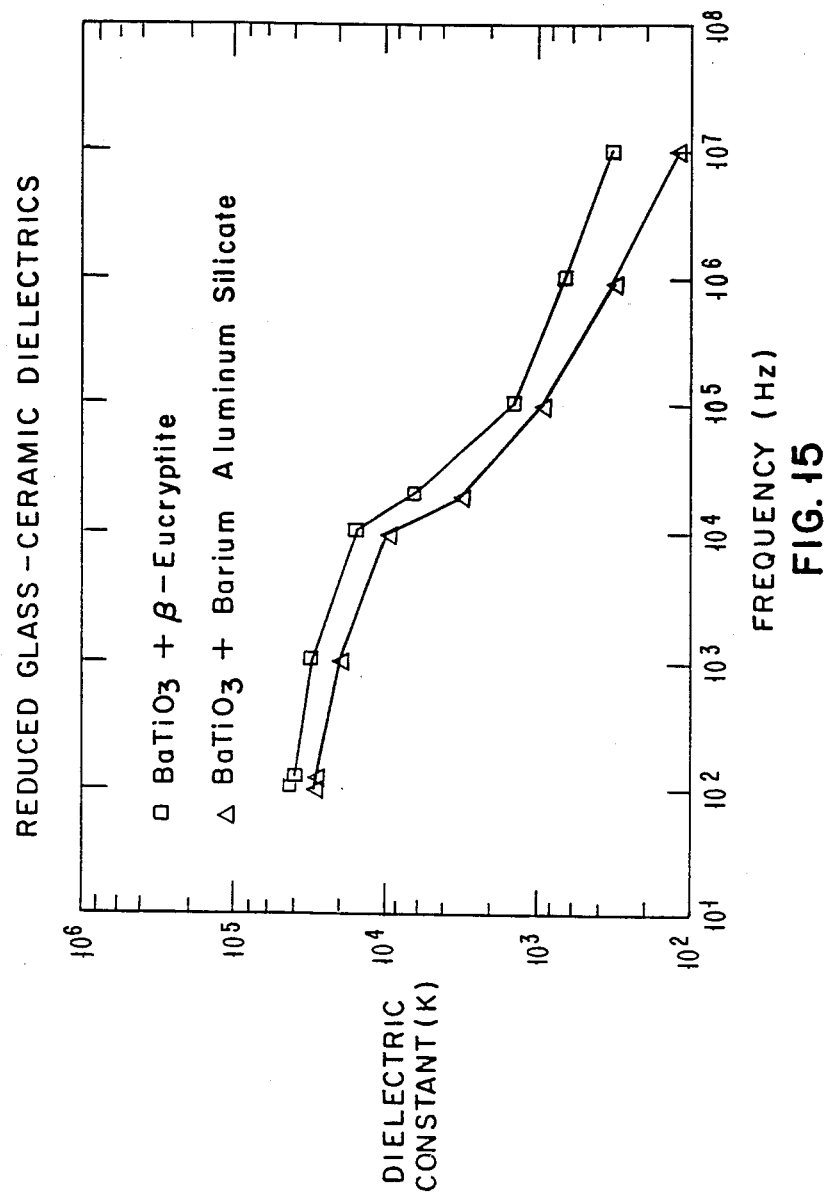
Figure 16:
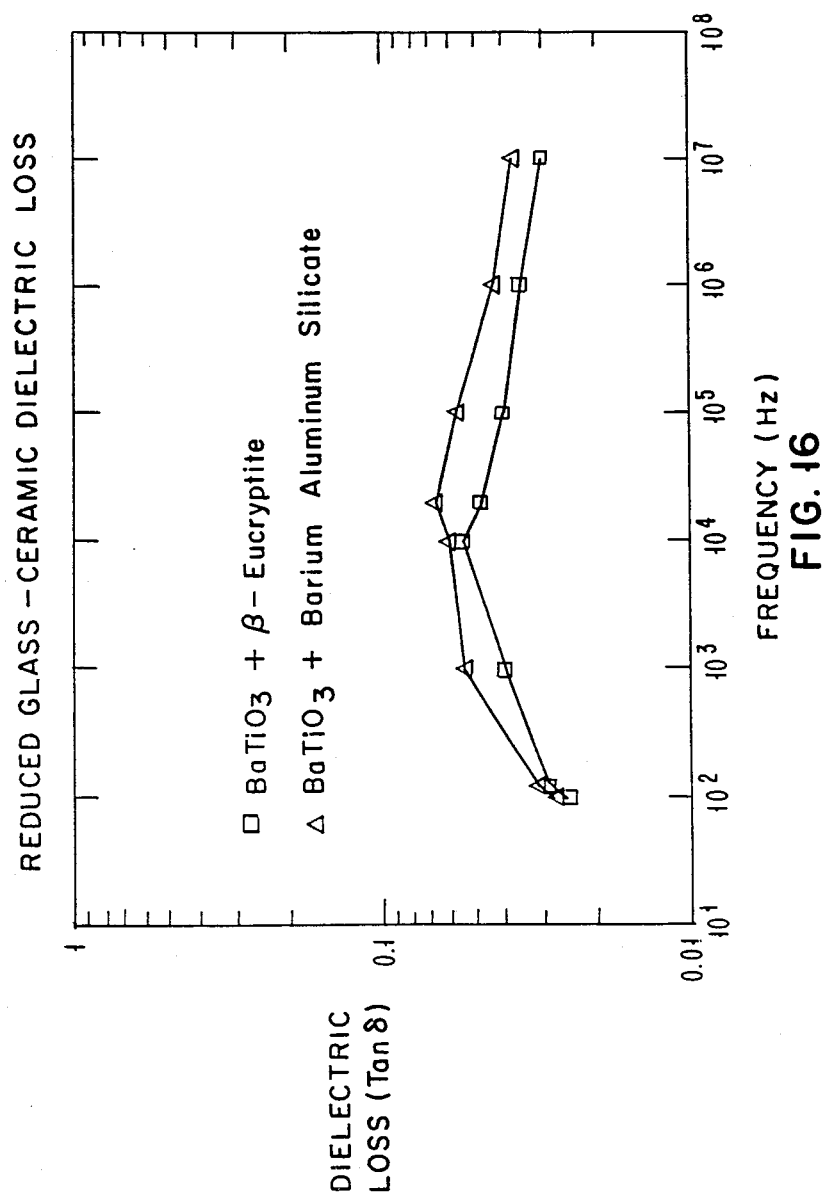

FIGS. 15 and 16 compare the dielectric properties of $BaTiO_3$ conducting grains having a β-eucryptite insulating phase (glass-ceramic II) to $BaTiO_3$ conducting grains having a barium aluminum silicate phase (glass-ceramic I containing 0.43 wt % Nb). The results indicate no significant differences in dielectric properties between these two samples. A significant advantage of having a microcrystalline β-eucryptite insulating layer surrounding the $BaTiO_3$ conducting grains, however, is that the apparent thermal expansion coefficient could be reduced to 3.2 ppm/° C. compared to 6.5 ppm/° C. for barium titanate alone, as shown in Table IV below:

TABLE IV

Thermal Expansion Coefficient of BaTiO₃ and Glass-Ceramics

| Sample | | TCE ($\times 10^{-6}$/°C.) |
|---|---|---|
| | BaTiO₃ | 6.5 |
| I | BaTiO₃ Barium Aluminum Silicate | 7.3 |
| II | BaTiO₃ β—eucryptite | 3.2 |
| III | BaTiO₃ α—cordierite | 5.9 |

The dielectric constants achieved in accordance with glass-ceramics made by the process of the present invention are approximately 200–300 at 10 MHz for both glass-ceramic I and II. Based on a two-layer model, the effective dielectric constant (Keff) is directly proportional to the ratio of grain diameter versus the thickness of the boundary phase. Higher dielectric constants can easily be obtained by increasing the grain size. Larger grain sizes were approached by annealing the samples at 950° C. for various amounts of time. The dielectric constant of 540 is achieved after one hour annealing time, and was raised to 750 after two hours annealing time.

Figure 17:
FIGS. 17–19 are transmission electron micrographs of experimental $BaTiO_3$ glass-ceramics as described in the examples hereinafter.
Figure 18:
Figure 19:
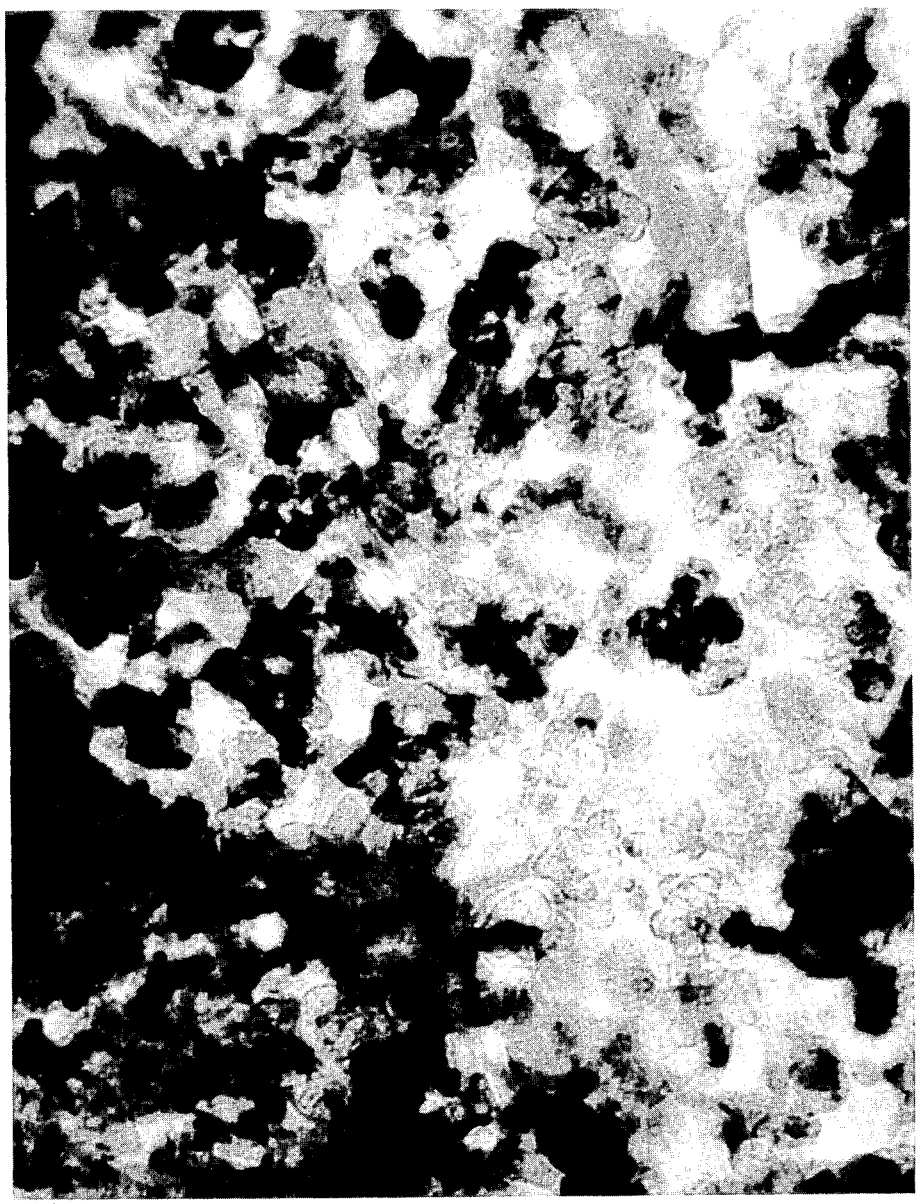

FIG. 17 shows the transmission electron micrograph of BaTiO₃/barium aluminum silicate glass-ceramic I after heat-treatment at 1060° C. for the second crystallization temperature. This micrograph shows that uniform fine grains (about 1 μm diameter) of semiconducting BaTiO₃ are surrounded by a thin (about 0.1 μm) microcrystalline barium aluminum silicate insulating layer. The same kind of microstructure is shown in FIG. 18, achieved for the glass-ceramic II comprising BaTiO₃ grains and a β-eucryptite phase. In this glass-ceramic composition, the microcrystalline insulating layer is β-eucryptite. However, in the case of glass-ceramic III, a BaTiO₃/α-cordierite composition, both BaTiO₃ and the cordierite phase crystallize almost at the same temperature range. The observation from a TEM bright field image as illustrated in FIG. 19 confirms that BaTiO₃ and cordierite grains are mixed in the microstructure. Such a mixed microstructure deteriorates the dielectric properties.

The foregoing description of the invention and experimental results establish that it is crucial to have Nb or other donor dopants to enhance the conductivity of the BaTiO₃ grain. Further, in accordance with the process of the present invention, fine-grain GBBL microstructures consisting of uniform BaTiO₃ conducting grains surrounded by a thin microcrystalline insulating barrier layer can be obtained having excellent dielectric properties, i.e., dielectric constant of 40,000 and dielectric loss of about 0.04 at 1 KHz, and 750 and 0.07 at 10 MHz, respectively. Further, in a preferred glass-ceramic material in accordance with the present invention, the thermal expansion coefficient is desirably reduced to 3.2 ppm/° C. for samples having a microcrystalline β-eucryptite insulating layer surrounding the BaTiO₃ conducting grains.

Having thus generally described the product and process of the present invention, with reference to specific embodiments thereof, it will be understood by one of ordinary skill in the art that various modifications can be made to the present invention without departing from the spirit and scope thereof.

What is claimed is:

1. A high dielectric constant glass-ceramic material comprising small conducting grains based on BaTiO₃ and/or SrTiO₃ on the order of about 0.5–10.0 μm surrounded by a thin microcrystalline insulating barrier layer at the grain boundary about 0.01–0.10 μm thick wherein the conductivity of the grains is enhanced by addition of about 0.1–4.0 mol% of a dopant selected from among Group V elements, Ge and Si substantially incorporated in the bulk lattice of the grains upon Ti sites.

2. The glass-ceramic material of claim 1, wherein said microcrystalline insulating barrier layer is uniformly distributed and titanate crystals are essentially absent.

3. The glass-ceramic material of claim 1, wherein said dopant is Nb, Ta or V.

4. The glass-ceramic material of claim 3, wherein said dopant is Nb.

5. The glass-ceramic material of claim 1, wherein said microcrystalline insulating barrier layer is β-eucryptite or barium aluminum silicate.

6. The glass-ceramic material of claim 1, wherein said conducting grains comprise barium titanate crystals.

7. The glass-ceramic material of claim 1, wherein said conducting grains comprise barium titanate crystals of about 1μm, said barrier layer comprises β-eucryptite of about 0.10 μm thickness and said dopant is Nb added in an amount of about 0.4 mol %.

8. In a module for supporting electronic circuit chips in a circuit including a planar ceramic substrate and a capacitive element contained within said substrate comprising thin conductive sheets and a thin layer of dielectric material therebetween, the improvement which comprises, said thin layers of dielectric material comprising the high dielectric constant glass-ceramic material of claim 1.

9. The module for supporting electronic circuit chips of claim 8, wherein said high dielectric constant glass-ceramic material of claim 1 is co-sintered with the thin layers of dielectric material.

10. The module of claim 8, wherein said capacitive element is on said module.

11. The module of claim 8, wherein said capacitive element is within said module.

12. A stack of capacitive elements composed of thin conductive sheets laminated with thin layers of the high dielectric glass-ceramic material of claim 1.

13. A high capacitance low frequency discrete capacitor formed of the glass-ceramic material of claim 1.

14. A high frequency module capacitor formed of the glass-ceramic material of claim 1.

15. A method for producing a high dielectric constant glass-ceramic material comprising:

(a) admixing about 40–65 total wt % BaO and/or SrO, about 20–35 wt % TiO₂, about 0.1–4.0 wt % of a dopant selected from among Group V elements, Ge and Si, about 10–15 wt % SiO₂, about 6–12 wt % Al₂O₃, about 0–2 wt % MgO, and about 0–3 wt % Li₂O, by a powder mixing process to obtain a homogeneous powder mixture;

(b) melting the powder mixture in a crucible or like vessel at a temperature of about 1500° to 1600° C. for about 1 to 4 hours to form a melt;

(c) quenching the melt by pouring it on a quench plate or into water to form glass cullets;

(d) crushing the glass cullets to obtain a powder mixture sufficiently fine to pass through a 325 mesh screen;

(e) admixing the powder mixture for about 10 to 30 hours to obtain a dry glass powder mixture of average particle size of about 2 to 7 μm;

(f) pressing the dry glass powder in a die at a pressure of about 5,000–15,000 lbs. to obtain a green compact;

(g) firing the green compact to sintering temperatures sufficient to accomplish sintering or coalescence of glass particles and conversion to a glass-ceramic by crystallization.

16. The method of claim 15, wherein said admixing step (a) uses 40–65 wt % BaO, 20–35 wt % $TiO_2$, 0.1–4.0 wt % $Nb_2O_5$ as the dopant, 10–15 wt % $SiO_2$, 6–12 wt % $Al_2O_3$, up to 2 wt % MgO, and up to 3 wt % $Li_2O$.

17. The method of claim 15, wherein said $Li_2O$ is replaced with an equivalent amount of $Na_2O$ or $K_2O$.

18. The method of claim 15, wherein said admixing steps (a) and (e) are performed by a ball mill powder mixing process.

19. The method of claim 15, wherein said crucible is a platinum or platinum alloy crucible, said quench plate is an aluminum plate, and said die is a stainless steel die.

20. The method of claim 15, wherein said pressing step (f) is a multilayer substrate fabrication process forming green sheets.

21. The method of claim 20, wherein said multilayer substrate fabrication process comprises grinding said dry glass powder mixture with a suitable organic binder and solvent to form a castable slurry wherein the average particle size is about 2 to 7 μm, casting said slurry into green sheets, and laminating said green sheets together in a laminating press to form a monolithic green substrate.

22. The method of claim 15 wherein said firing step (g) comprises an oxidation heating step, a first crystallization heating step in a reducing atmosphere, a second crystallization heating step in a reducing atmosphere, and a cooling step in an oxidizing atmosphere.

23. The method according to claim 22, wherein said oxidation heating step comprises heating the green compact at a rate of about 3°–5° C./min. in an oxidizing atmosphere to a temperature sufficient to burn off carbonaceous material, and holding at said temperature for about 1–2 hours; said first crystallization heating step comprises heating said green compact at a rate of about 3°–5° C./min. to the first crystallization temperature of the glass, and holding at that temperature for about 3–5 hours; said second crystallization heating step comprises heating the green compact at a rate of about 3°–5° C./min. to the second crystallization temperature of the glass, and holding at that temperature for about 1–2 hours; and said cooling step comprises cooling the resulting glass-ceramic material to room temperature at a rate of about 4°–6° C./min.

* * * * *